US012807178B2

(12) United States Patent
Kim

(10) Patent No.: US 12,807,178 B2
(45) Date of Patent: Nov. 24, 2026

(54) VEHICLE CONTROL APPARATUS AND METHOD THEREOF

(71) Applicants: Hyundai Motor Company, Seoul (KR); Kia Corporation, Seoul (KR)

(72) Inventor: Hyun Ju Kim, Yongin-Si (KR)

(73) Assignee: Hyundai Motor Company ; Kia Corporation, Seoul (KR)

( * ) Notice: Subject to any disclaimer, the term of this patent is extended or adjusted under 35 U.S.C. 154(b) by 123 days.

(21) Appl. No.: 18/765,531

(22) Filed: Jul. 8, 2024

(65) Prior Publication Data

US 2025/0121850 A1 Apr. 17, 2025

(30) Foreign Application Priority Data

Oct. 13, 2023 (KR) ........................ 10-2023-0136881

(51) Int. Cl.

*B60W 60/00* (2020.01)
*B60W 40/04* (2006.01)
*G01S 17/66* (2006.01)

(52) U.S. Cl.

CPC .......... *B60W 60/001* (2020.02); *B60W 40/04* (2013.01); *G01S 17/66* (2013.01);
(Continued)

(58) Field of Classification Search

CPC ............... B60W 60/001; B60W 40/04; B60W 2420/408; B60W 2554/4044;
(Continued)

(56) References Cited

U.S. PATENT DOCUMENTS 5,379,044 A * 1/1995 Carlson ................. G01S 13/726 342/90
2003/0219147 A1* 11/2003 Nishiura ................... G06T 7/20 382/103
(Continued)

FOREIGN PATENT DOCUMENTS

JP 2020091743 A * 6/2020

OTHER PUBLICATIONS

V. Vaquero, I. del Pino, F. Moreno-Noguer, J. Sola, A. Sanfeliu and J. Andrade-Cetto, "Dual-Branch CNNs for Vehicle Detection and Tracking on LiDAR Data," in IEEE Transactions on Intelligent Transportation Systems, vol. 22, No. 11, pp. 6942-6953, Nov. 2021, doi: 10.1109/TITS.2020.2998771. (Year: 2021).*

*Primary Examiner* — Erin D Bishop
*Assistant Examiner* — Brittany Renee Peko
(74) *Attorney, Agent, or Firm* — Banner & Witcoff, Ltd.

(57) ABSTRACT

A vehicle control apparatus may comprise a sensor, memory, and processor. The processor may determine, from unreliable track information indicating a second vehicle ahead of a detected first vehicle, conditions such as the second vehicle's motion state, type, or initial heading direction. It then may adjust virtual track data accordingly, considering factors like a virtual track path, a virtual box orientation, or a virtual box position. The vehicle control apparatus may output signals indicating this adjusted data, guided by criteria such as the second vehicle's motion, alignment with a host vehicle, type, a number of stored pieces of virtual track information, a virtual track path length, a virtual box position, or lane changes of the host vehicle. The vehicle control apparatus may control, based on the signals, autonomous operation of the host vehicle.

21 Claims, 13 Drawing Sheets

(52) U.S. Cl.
CPC ................. *B60W 2420/408* (2024.01); *B60W 2554/4044* (2020.02); *B60W 2554/4045* (2020.02)

(58) Field of Classification Search
CPC ..... B60W 2554/4045; B60W 2520/10; B60W 2520/14; B60W 2554/402; G01S 17/89; G01S 17/931
See application file for complete search history.

(56) References Cited

U.S. PATENT DOCUMENTS

| | | | | |
|---|---|---|---|---|
| 2014/0121928 | A1* | 5/2014 | Kurumisawa | B60T 8/1755 701/70 |
| 2020/0103523 | A1* | 4/2020 | Liu | G01S 13/87 |
| 2020/0133274 | A1 | 4/2020 | Kim | |
| 2022/0066020 | A1* | 3/2022 | Fu | G01S 13/589 |
| 2023/0003871 | A1* | 1/2023 | Qian | G06N 20/00 |
| 2023/0135702 | A1 | 5/2023 | Oh | |
| 2024/0153106 | A1* | 5/2024 | Sasatani | G06V 20/70 |
| 2025/0026376 | A1* | 1/2025 | Schlacter | G06T 7/20 |

* cited by examiner

VEHICLE CONTROL APPARATUS AND METHOD THEREOF

CROSS-REFERENCE TO RELATED APPLICATION

This application claims the benefit of priority to Korean Patent Application No. 10-2023-0136881, filed in the Korean Intellectual Property Office on Oct. 13, 2023, the entire contents of which are incorporated herein by reference.

TECHNICAL FIELD

The present disclosure relates to a vehicle control apparatus and a method thereof, and more particularly, relates to technologies of identifying an external object by using a sensor (e.g., light detection and ranging (LiDAR) sensor).

BACKGROUND

An autonomous vehicle or a vehicle in which a driving assistance device is activated may identify a surrounding environment by a sensor (e.g., LiDAR) and may collect data for driving.

The vehicle may obtain data indicating a position of an object around the vehicle by the LiDAR. The LiDAR may obtain a distance from the LiDAR to the object based on an interval between a time point when a laser is transmitted and a time point when the laser reflected from the object is received. The vehicle may identify a position of one point included in the outside of the object, on a space in which the vehicle is present, based on an angle of the transmitted laser and the distance to the object.

A technology for accurately identifying a pre-preceding vehicle covered by a preceding vehicle is desirable. If the pre-preceding vehicle covered by the preceding vehicle is not accurately identified, as at least one of a heading direction of a virtual box corresponding to the pre-preceding vehicle, a position of the virtual box corresponding to the pre-preceding vehicle, or a track path tracking the pre-preceding vehicle, or any combination thereof may be incorrectly identified, a driving path of the autonomous vehicle or the vehicle in which the driving assistance device is activated may be incorrectly set.

SUMMARY

According to the present disclosure, an apparatus may comprise a sensor, a memory, and a processor, wherein the processor configured to determine, based on track information not meeting reference reliability, wherein the track information represents a second external vehicle traveling in front of a first external vehicle detected by the sensor, at least one of whether the second external vehicle at a first time point is in a moving state, a type of the second external vehicle, or a first heading direction of a virtual box corresponding to the second external vehicle, obtain, based on the determination, virtual track information by adjusting at least one of a track path tracking the second external vehicle, the first heading direction of the virtual box, or a position of the virtual box, and output a signal indicating the virtual track information as track information representing the second external vehicle at the first time point, based on at least one of whether the second external vehicle is in the moving state, whether a difference between the first heading direction of the virtual box and a second heading direction of a vehicle is less than or equal to a specified angle, the type of the second external vehicle, a number of pieces of the virtual track information from a second time point to the first time point, which is later than the second time point, the pieces of the virtual track information being stored in the memory, a length of a virtual track path included in the virtual track information, the position of the virtual box, wherein the virtual box is included in the virtual track information, or whether the vehicle makes a lane change.

The apparatus, wherein the processor is configured to obtain the virtual track information, based on the second external vehicle being in the moving state, the track information representing the second external vehicle at the first time point, the track information not meeting the reference reliability, the type of the second external vehicle being a passenger vehicle, a commercial vehicle, or an unknown type of vehicle, the virtual box being in a lateral movement state, or the first heading direction of the virtual box not being a same direction as the vehicle, and wherein the processor is configured to control, based on the signal, autonomous operation of the vehicle.

The apparatus, wherein the processor is configured to delete the pieces of the virtual track information stored in the memory, based on the second external vehicle being in the moving state, the track information representing the second external vehicle at the first time point, the track information not meeting the reference reliability, the type of the second external vehicle not being a passenger vehicle, a commercial vehicle, or an unknown type of vehicle, or the virtual box not being in a lateral movement state and the first heading direction of the virtual box being a same direction as the vehicle.

The apparatus, wherein the processor is configured to adjust a position of the virtual box at the first time point, wherein the adjustment of the position of the virtual box is based on the track information representing the second external vehicle at the first time point and each of positions of the virtual box, the positions being included in each of datasets corresponding to the second external vehicle from the second time point to the first time point, and the datasets being stored in the memory, obtain the track information representing the second external vehicle at the first time point and a third heading direction, wherein the first heading direction of the virtual box is adjusted in the third heading direction, the first heading direction is included in each of the datasets corresponding to the second external vehicle from the second time point to the first time point, and the datasets is stored in the memory, and obtain, based on the third heading direction and the adjusted position of the virtual box at the first time point, the virtual track information.

The apparatus, wherein the processor is configured to store the obtained virtual track information in the memory, based on the second external vehicle being in the moving state, the difference between the first heading direction of the virtual box and the second heading direction of the vehicle being less than or equal to the specified angle, the type of the second external vehicle, the number of the pieces of the virtual track information being greater than or equal to a reference number, the length of the virtual track path being greater than a reference length, the position of the virtual box being present in a specified area, and the vehicle not making the lane change.

The apparatus, wherein the processor is configured to determine a first scatter plot of first tracking points included in the virtual track information and a second scatter plot of second tracking points included in the track information representing the second external vehicle at the first time point, and store, based on the first scatter plot being less than a reference scatter plot and the second scatter plot being greater than or equal to the reference scatter plot, the virtual track information in the memory.

The apparatus, wherein the virtual box includes a first virtual box, and wherein the processor is configured to select, as a first value, a larger one of a width value of the first virtual box and a reference width value, wherein the width value is obtained based on a plurality of points corresponding to the second external vehicle at the first time point, select, as a second value, a larger one of a length value of the first virtual box and a reference length value, wherein the length value is obtained based on the plurality of points corresponding to the second external vehicle at the first time point, and generate, based on the first value and the second value, a second virtual box, wherein a size of the first virtual box is adjusted in the second virtual box.

The apparatus, wherein the processor is configured to determine, based on a third point corresponding to a center of a segment formed by a first point and a second point associated with the first value, first coordinates in a direction of a second axis among a first axis, the second axis, and a third axis of the first virtual box included in the track information, wherein the first virtual box represents the second external vehicle at the first time point, and wherein the first axis is parallel to a driving direction of the vehicle, and the second axis and the third axis being perpendicular to the first axis, and determine, based on the first coordinates in the direction of the second axis and second coordinates in a direction of the first axis, that the track information does not meet the reference reliability.

The apparatus, wherein the processor is configured to store, based on a moving-window scheme, each of the pieces of the virtual track information in the memory, wherein each of the pieces of the virtual track information is obtained at a time from the second time point to the first time point.

The apparatus, wherein the processor is configured to perform time compensation for each of the pieces of the virtual track information stored in the memory, based on at least one of a longitudinal speed of the vehicle, a lateral speed of the vehicle, a reference time associated with the vehicle, a yaw rate of the vehicle, or coordinates of the virtual box corresponding to the second external vehicle at the first time point.

The apparatus, wherein the processor is configured to determine, based on at least one of a speed of the vehicle or a yaw rate of the vehicle, that the vehicle enters a curved section, and adjust, based on a portion of the virtual track path included in the virtual track information, at least one of the first heading direction of the virtual box, the position of the virtual box, a size of the virtual box, or the track path tracking the second external vehicle.

According to the present disclosure, a method performed by a processor, the method may comprise determining, based on track information not meeting reference reliability, wherein the track information represents a second external vehicle traveling in front of a first external vehicle detected by a sensor, at least one of whether the second external vehicle at a first time point is in a moving state, a type of the second external vehicle, or a first heading direction of a virtual box corresponding to the second external vehicle, obtaining, based on the determining, virtual track information by adjusting at least one of a track path tracking the second external vehicle, the first heading direction of the virtual box, or a position of the virtual box, and outputting a signal indicating the virtual track information as track information representing the second external vehicle at the first time point, based on at least one of whether the second external vehicle is in the moving state, whether a difference between the first heading direction of the virtual box and a second heading direction of a vehicle is less than or equal to a specified angle, the type of the second external vehicle, a number of pieces of the virtual track information from a second time point to the first time point, which is later than the second time point, the pieces of the virtual track information being stored in a memory, a length of a virtual track path included in the virtual track information, the position of the virtual box, wherein the virtual box is included in the virtual track information, or whether the vehicle makes a lane change.

The method, may further comprise obtaining the virtual track information, based on the second external vehicle being in the moving state, the track information representing the second external vehicle at the first time point, the track information not meeting the reference reliability, the type of the second external vehicle being passenger vehicle, a commercial vehicle, or an unknown type of vehicle, and the virtual box being in a lateral movement state, or the first heading direction of the virtual box not being a same direction as the vehicle, and controlling, based on the signal, autonomous operation of the vehicle.

The method, may further comprise deleting the pieces of the virtual track information stored in the memory, based on the second external vehicle being in the moving state, the track information representing the second external vehicle at the first time point, the track information not meeting the reference reliability, the type of the second external vehicle not being a passenger vehicle, a commercial vehicle, or an unknown type of vehicle, or the virtual box not being in a lateral movement state and the first heading direction of the virtual box being a same direction as the vehicle.

The method, may further comprise adjusting a position of the virtual box at the first time point, wherein the adjusting the position of the virtual box is based on the track information representing the second external vehicle at the first time point and each of positions of the virtual box, the positions being included in each of datasets corresponding to the second external vehicle from the second time point to the first time point, the datasets being stored in the memory, obtaining the track information representing the second external vehicle at the first time point and a third heading direction wherein the first heading direction of the virtual box is adjusted in the third heading direction, the first heading direction is included in each of the datasets corresponding to the second external vehicle from the second time point to the first time point, and the datasets is stored in the memory, and obtaining, based on the third heading direction and the adjusting the position of the virtual box at the first time point, the virtual track information.

The method may further comprise storing the obtained virtual track information in the memory based on the second external vehicle being in the moving state, the difference between the first heading direction of the virtual box and the second heading direction of the vehicle being less than or equal to the specified angle, the type of the second external vehicle, the number of the pieces of the virtual track information being greater than or equal to a reference number, the length of the virtual track path being greater than a reference length, the position of the virtual box being present in a specified area, and the vehicle not making the lane change.

The method may further comprise determining a first scatter plot of first tracking points included in the virtual track information and a second scatter plot of second tracking points included in the track information representing the second external vehicle at the first time point, and storing, based on the first scatter plot being less than a reference scatter plot and the second scatter plot being greater than or equal to the reference scatter plot, the virtual track information in the memory.

The method, wherein the virtual box includes a first virtual box and may further comprise selecting, as a first value, a larger one of a width value of the first virtual box and a reference width value, wherein the width value is obtained based on a plurality of points corresponding to the second external vehicle at the first time point, selecting, as a second value, a larger one of a length value of the first virtual box and a reference length value, wherein the length value is obtained based on the plurality of points corresponding to the second external vehicle at the first time point, and generating, based on the first value and the second value, a second virtual box, wherein a size of the first virtual box is adjusted in the second virtual box.

The method of claim 18 may further comprise determining, based on a third point corresponding to a center of a segment formed by a first point and a second point associated with the first value, first coordinates in a direction of a second axis among a first axis, the second axis, and a third axis of the first virtual box included in the track information, wherein the first virtual box represents the second external vehicle at the first time point, and wherein the first axis is parallel to a driving direction of the vehicle, and the second axis and the third axis being perpendicular to the first axis, and determining, based on the first coordinates in the direction of the second axis and second coordinates in a direction of the first axis, that the track information does not meet the reference reliability.

The method may further comprise storing, based on a moving-window scheme, each of the pieces of the virtual track information in the memory, wherein each of the pieces of the virtual track information is obtained at a time from the second time point to the first time point, and performing time compensation for each of the pieces of the virtual track information stored in the memory, based on at least one of a longitudinal speed of the vehicle, a lateral speed of the vehicle, a reference time associated with the vehicle, a yaw rate of the vehicle, or coordinates of the virtual box corresponding to the second external vehicle at the first time point.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
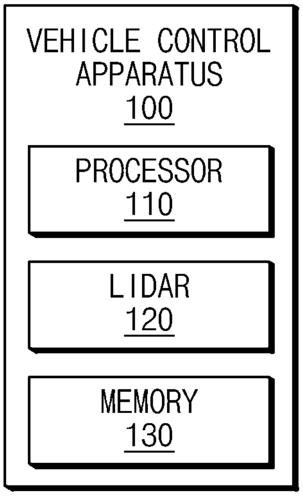
FIG. 1 shows an example of a block diagram of a vehicle control apparatus according to an example of the present disclosure.

Hereinafter, some examples of the present disclosure will be described in detail with reference to the exemplary drawings. In the drawings, the same reference numerals will be used throughout to designate the same or equivalent components. In addition, a detailed description of well-known features or functions will be ruled out in order not to unnecessarily obscure the gist of the present disclosure.

In describing components of examples of the present disclosure, the terms first, second, A, B, (a), (b), and the like may be used herein. These terms are only used to distinguish one component from another component, but do not limit the corresponding components irrespective of the order or priority of the corresponding components. Furthermore, unless otherwise defined, all terms including technical and scientific terms used herein are to be interpreted as is customary in the art to which this present disclosure belongs. It will be understood that terms used herein should be interpreted as having a meaning that is consistent with their meaning in the context of this present disclosure and the relevant art and will not be interpreted in an idealized or overly formal sense unless expressly so defined herein.

The present disclosure may include various examples for accurately identifying a pre-preceding vehicle covered by a preceding vehicle. Hereinafter, the preceding vehicle may be referred to as a first external vehicle, and the pre-preceding vehicle may be referred to as a second external vehicle. However, names of the preceding vehicle and the pre-preceding vehicle are not limited thereto.

Hereinafter, examples of the present disclosure will be described in detail with reference to FIGS. 1 to 13.

FIG. 1 shows an example of a block diagram of a vehicle control apparatus according to an example of the present disclosure.

Referring to FIG. 1, a vehicle control apparatus 100 according to an example of the present disclosure may be implemented inside or outside a vehicle, and some of components included in the vehicle control apparatus 100 may be implemented inside or outside the vehicle. In this case, the vehicle control apparatus 100 may be integrally configured with control units in the vehicle or may be implemented as a separate device to be connected with the control units of the vehicle by a separate connection means. For example, the vehicle control apparatus 100 may further include components which are not shown in FIG. 1.

The vehicle control apparatus 100 according to an example may include a processor 110, light detection and ranging (LiDAR) 120, and a memory 130. The processor 110, the LiDAR 120, and the memory 130 may be electronically or operably coupled with each other by an electronical component including a communication bus.

Hereinafter, that pieces of hardware are operably coupled with each other may include that a direct connection or an indirect connection between the pieces of hardware is established in a wired or wireless manner, such that second hardware is controlled by first hardware among the pieces of hardware.

The different blocks are illustrated, but an example is not limited thereto. For example, some of the pieces of hardware of FIG. 1 may be included in a single integrated circuit including a system on a chip (SoC). Types of the pieces of hardware included in the vehicle control apparatus 100 and/or the number of the pieces of hardware are/is limited to those shown in FIG. 1. For example, the vehicle control apparatus 100 may include some of the pieces of hardware shown in FIG. 2.

The vehicle control apparatus 100 according to an example may include hardware for processing data based on one or more instructions. The hardware for processing the data may include the processor 110.

For example, the hardware for processing the data may include an arithmetic and logic unit (ALU), a floating point unit (FPU), a field programmable gate array (FPGA), a central processing unit (CPU), and/or an application processor (AP). The processor 110 may have a structure of a single-core processor or may have a structure of a multi-core processor including a dual core, a quad core, a hexa core, or an octa core.

The LiDAR 120 included in the vehicle control apparatus 100 according to an example may obtain datasets for identifying a surrounding thing of the vehicle control apparatus 100. For example, the LiDAR 120 may identify at least one of a position of the surrounding thing, a motion direction of the surrounding thing, or a speed of the surrounding thing, or any combination thereof, based on that a pulse laser signal radiated from the LIDAR 120 is reflected from the surrounding object to return.

For example, the LiDAR may 120 obtain datasets representing an external object in a space formed by a first axis, a second axis, and a third axis, based on a pulse laser signal reflected from the surrounding thing. For example, the LiDAR 120 may obtain datasets representing an external object using a plurality of points in the space formed by the first axis, the second axis, and the third axis, based on receiving a pulse laser signal at a specified period. For example, the first axis may include an x-axis. For example, the second axis may include a y-axis. For example, the third axis may include a z-axis.

The processor 110 included in the vehicle control apparatus 100 according to an example may radiate light from the vehicle using the LiDAR 120. For example, the processor 110 may receive light radiated from the vehicle. The processor 110 may identify at least one of the position of the surrounding thing, the speed of the surrounding thing, or the motion direction of the surrounding thing, or any combination thereof, based on a time when the light radiated from the vehicle is transmitted and a time when the light radiated from the vehicle is received.

For example, the processor 110 may obtain datasets representing an external object using the plurality of points, based on the time when the light radiated from the vehicle is transmitted and the time when the light radiated from the vehicle is received.

The memory 130 included in the vehicle control apparatus 100 according to an example may include a hardware component for storing data and/or an instruction input and/or output from the processor 110 of the vehicle control apparatus 100.

For example, the memory 130 may include a volatile memory including a random-access memory (RAM) and or a non-volatile memory including a read-only memory (ROM).

For example, the volatile memory may include at least one of a dynamic RAM (DRAM), a static RAM (SRAM), a cache RAM, or a pseudo SRAM (PSRAM), or any combination thereof.

For example, the non-volatile memory may include at least one of a programmable ROM (PROM), an erasable PROM (EPROM), an electrically erasable PROM (EEPROM), a flash memory, a hard disk, a compact disc, a solid state drive (SSD), or an embedded multi-media card (eMMC), or any combination thereof.

The processor 110 included in the vehicle control apparatus 100 according to an example may obtain track information representing a second external vehicle at a first time point, which travels in front of a first external vehicle, by the LiDAR 120. For example, the track information may include at least one of a speed of an external vehicle, a position of a virtual box corresponding to the external vehicle, or a heading direction of the virtual box corresponding to the external vehicle, or any combination thereof.

In an example, the processor 110 may identify whether at least one of whether the second external vehicle at the first time, which travels in front of the first external vehicle which is obtained by the LiDAR 120, is in a moving state, a type of the second external vehicle, or a first heading direction of a virtual box corresponding to the second external vehicle, or any combination thereof meets a specified condition, based on that the track information representing the second external vehicle does not meet reference reliability.

For example, the processor 110 may obtain virtual track information by correcting at least one of a track path tracking the second external vehicle, the first heading direction of the virtual box, or the position of the virtual box, or any combination thereof, based on that the specified condition is met. For example, the track path tracking the second external vehicle may be generated based on a reference point included in the virtual box corresponding to the second external vehicle identified at each time point.

In an example, the processor 110 may output virtual track information as the track information representing the second external vehicle at the first time point, based on at least one of whether the second external vehicle is in the moving state, whether a difference between the first heading direction of the virtual box and a second heading direction of the vehicle is less than or equal to a specified angle, the type of the second external vehicle, the number of pieces of virtual track information from a second time point prior to the first time point to the first time point, which are stored in the memory 130 and include the virtual track information, a length of a virtual track path included in the virtual track information, a position of the virtual box included in the virtual track information, or whether the vehicle makes a lane change, or any combination thereof.

In an example, the processor 110 may obtain the virtual track information, based on that the second external vehicle is in the moving state and there is the track information representing the second external vehicle at the first time point, which does not meet the reference reliability, that the type of the second external vehicle is a passenger vehicle, a commercial vehicle, or an unknown type of vehicle, and that the virtual box is in lateral movement state or the first heading direction of the virtual box is not the same direction as the vehicle.

For example, that the virtual box in the lateral movement state may include a state in which a segment forming a virtual box corresponding to the rear of the second external vehicle and the heading direction of the virtual box form a right angle. For example, the heading direction of the virtual box may include one of a front direction, a left side direction, a right side direction, or a rear direction.

For example, that the first heading direction of the virtual box is not the same direction as the vehicle may include a state in which the first heading direction of the virtual box is not the same direction as a direction in which the vehicle is traveling (e.g., a positive or a negative direction of the x-axis).

In an example, the processor 110 may delete pieces of virtual track information from a time point prior to the first point to the first time point, which are stored in the memory virtual track information, without 130 and include the obtaining the virtual track information, based on that the second external vehicle is in the moving state and there is the track information representing the second external vehicle at the first time point, which does not meet the reference reliability, and that the type of the second external vehicle is not a passenger vehicle, a commercial vehicle, or an unknown type of vehicle, or that the virtual box is not in the lateral movement state and the first heading direction of the virtual box is the same direction as the vehicle.

In an example, the processor 110 may correct a position of the virtual box at the first time point, based on the track information representing the second external vehicle at the first time point and each of positions of the virtual box corresponding to the second external vehicle, which are included in each of datasets corresponding to the second external vehicle from the second time point prior to the first time point to the first time point, which are stored in the memory 130.

In an example, the processor 110 may obtain track information representing the second external vehicle at the first time point and a third heading direction in which the first heading direction of the virtual box is corrected, which is included in each of datasets corresponding to the second external vehicle from the second time point to the first time point, which are stored in the memory 130.

In an example, the processor 110 may obtain the virtual track information, based on the corrected position of the virtual box at the first time point and the third heading direction. The processor 110 may output the obtained virtual track information as the track information representing the second external vehicle at the first time point.

In an example, the processor 110 may store the obtained virtual track information in the memory 130, based on that the second external vehicle is in the moving state, that the difference between the first heading direction of the virtual box and the second heading direction of the vehicle is less than or equal to the specified angle, that the type of the second external vehicle is classified as a vehicle, that the number of the pieces of track information stored in the memory 130 is greater than or equal to a reference number (e.g., about 20), that the length of the virtual track path included in the virtual track information is greater than a reference length, that the position of the virtual box is present in a specified area, or that the vehicle does not make the lane change. For example, the processor 110 may store the obtained virtual track information in a buffer area of the memory 130.

In an example, the processor 110 may identify first tracking points included in the virtual track information, based on obtaining the virtual track information. For example, the first tracking points may include points constituting the virtual track path included in the virtual track information. The processor 110 may identify a first scatter plot of the first tracking points included in the virtual track information, based on obtaining the virtual track information.

In an example, the processor 110 may identify second tracking points included in the track information representing the second external vehicle at the first time point. For example, the second tracking points may include points constituting a track path included in the track information representing the second external vehicle at the first time point. The processor 110 may identify a second scatter plot of the second tracking points included in the track information representing the second external vehicle at the first time point.

For example, each of the first scatter plot and the second scatter plot may include at least one of dispersion, a standard deviation, a range, an interquartile range, an absolute deviation, a coefficient of variation, or deflection, or any combination thereof.

In an example, the processor 110 may store the virtual track information in the memory 130, based on that the first scatter plot is less than a reference scatter plot and that the second scatter plot is greater than or equal to the reference scatter plot. For example, the processor 110 may store the virtual track information in the buffer area of the memory 130, based on that the first scatter plot is less than the reference scatter plot and that the second scatter plot is greater than or equal to the reference scatter plot.

In an example, the processor 110 may identify a first virtual box corresponding to the virtual box. The processor 110 may identify a first value which is relatively larger between a width of the first virtual box, which is obtained by the plurality of points corresponding to the second external vehicle at the first time point, and a reference width. For example, the processor 110 may select the first value which is relatively larger between the width of the first virtual box, which is obtained by the plurality of points corresponding to the second external vehicle at the first time point, and the reference width.

In an example, the processor 110 may identify a second value which is relatively larger between a length of the first virtual box, which is obtained by the plurality of points corresponding to the second external vehicle at the first time point, and a reference length. For example, the processor 110 may select the second value which is relatively larger between the length of the first virtual box, which is obtained by the plurality of points corresponding to the second external vehicle at the first time point, and the reference length.

The processor 110 may generate a second virtual box in which the size of the first virtual box is corrected, based on the selected first value and the selected second value. For example, the second virtual box may include a virtual box which is included in the virtual track information and corresponds to the second external vehicle.

In an example, the processor 110 may identify a third point corresponding to the center of a segment formed by a first point and a second point corresponding to the first value. The processor 110 may identify first coordinates in the direction of the second axis among the first axis (e.g., a driving direction of a vehicle), the second axis (e.g., perpendicular to the first axis), and the third axis (e.g., perpendicular to the first axis and the second axis), based on the third point corresponding to the center of the segment formed by the first point and the second point corresponding to the first value. For example, the first coordinates in the direction of the second axis may include a y coordinate.

In an example, the processor 110 may identify position of the second virtual box, based on the identified first coordinates in the direction of the second axis and second coordinates in the direction of the first axis of the first virtual box included in the track information representing the second external vehicle at the first time, which does not meet the reference reliability. For example, the second coordinates in the direction of the first axis may include a x coordinate.

In an example, depending on a time if each of the pieces of virtual track information from the time point prior to the first time point to the first time point, which are stored in the memory 130 and include the virtual track information, is obtained, the processor 110 may store each of the pieces of virtual track information, using a moving-window scheme.

In an example, the processor 110 may perform time compensation for each of the pieces of virtual track information stored in the memory 130, based on at least one of a longitudinal speed of the vehicle, a lateral speed of the vehicle, a reference time, a yaw rate of the vehicle, or coordinates of the virtual box corresponding to the second external vehicle at the first time point, or any combination thereof. Contents for performing the time compensation for each of the pieces of virtual track information will be described below with reference to FIG. 5.

In an example, the processor 110 may identify that the vehicle enters a curved section, based on at least one of a speed of the vehicle or a yaw rate of the vehicle, or any combination thereof.

In an example, the processor 110 may correct at least one of the first heading direction of the virtual box, the position of the virtual box, the size of the virtual box, or the track path tracking the second external vehicle, or any combination thereof, based on a portion of the virtual track path included in the virtual track information.

As described above, the processor 110 of the vehicle control apparatus 100 according to an example may obtain the virtual track information by correcting the at least one of the first heading direction of the virtual box, the position of the virtual box, the size of the virtual box, or the track path tracking the second external vehicle, or the any combination thereof. The processor 110 may output the virtual track information as the track information representing the second external vehicle at the first time point, thus effectively tracking the second external vehicle, if the second external vehicle is covered by the first external vehicle.

Figure 2:
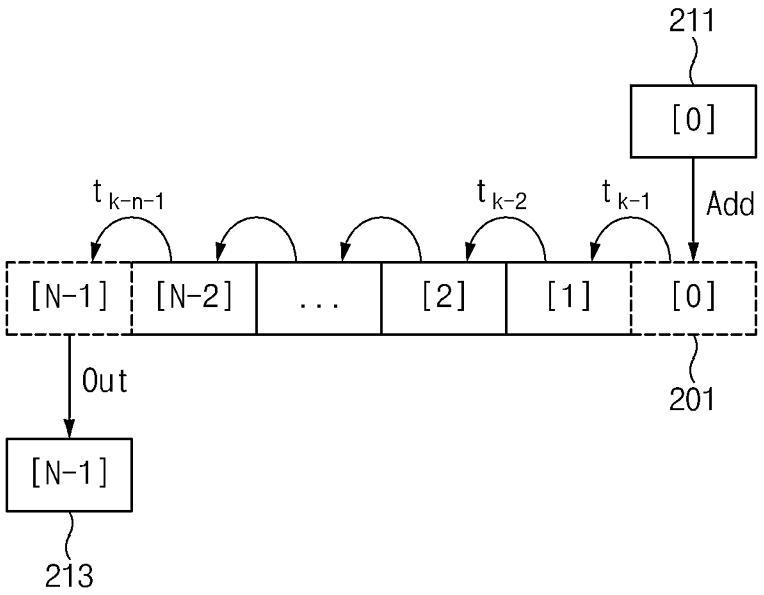
FIG. 2 shows an example of storing virtual track information in a memory, in an example of the present disclosure.

FIG. 2 shows an example of storing virtual track information in a memory, in an example of the present disclosure.

Referring to FIG. 2, a processor (e.g., a processor 110 of FIG. 1) of a vehicle control apparatus (e.g., a vehicle control apparatus 100 of FIG. 1) according to an example may obtain datasets associated with a second external vehicle which travels in front of a first external vehicle, through LiDAR (e.g., LiDAR 120 of FIG. 1).

In an example, the processor may obtain virtual track information. For example, the virtual track information may include information associated with the second external vehicle which travels in front of the first external vehicle. For example, the virtual track information may include information associated with the second external vehicle which is covered by the first external vehicle.

For example, the processor may obtain the virtual track information, based on track information representing the second external vehicle at a first time point and datasets corresponding to the second external vehicle prior to the first time point, which are stored in a memory (e.g., a memory 130 of FIG. 1). The processor may store the obtained virtual track information in the memory.

For example, the processor may store pieces of virtual track information in the memory, based on a moving-window scheme. For example, the processor may store the pieces of virtual track information in a buffer area 201 formed in the memory, based on the moving-window scheme.

For example, the processor may store virtual track information 211 corresponding to the second external vehicle at the first time point, in a first area of the buffer area 201 of the memory. The processor may move the virtual track information 211 corresponding to the second external vehicle at the first time point, which is stored in the first area, to a second area, based on obtaining virtual track information, corresponding to the second external vehicle at a second time point subsequent to the first time point, at the second time point, and may store virtual track information corresponding to the second external vehicle at the second time point in the first area.

For example, if it is impossible to store the virtual track information in the buffer area 201, the processor may delete virtual track information 213 stored in an n−1 area. For example, if it is impossible to store newly obtained virtual track information because some or all the pieces of virtual track information are stored in the buffer area 201, the processor may delete the virtual track information 213 stored in the n−1 area.

For example, the processor may identify or determine that some or all the pieces of virtual track information are stored in the buffer area 201, based on the virtual track information 211 representing the second external vehicle at the first time point is obtained, may detect the virtual track information 213 of the n−1 area, which is oldest stored in the buffer area 201, and may store the virtual track information 211 representing the second external vehicle at the first time point in the buffer area 201.

As described above, the processor of the vehicle control apparatus according to an example may store pieces of virtual track information in the memory in the moving-window scheme, thus efficiently storing (or updating) virtual track information at the first time point.

Figure 3:
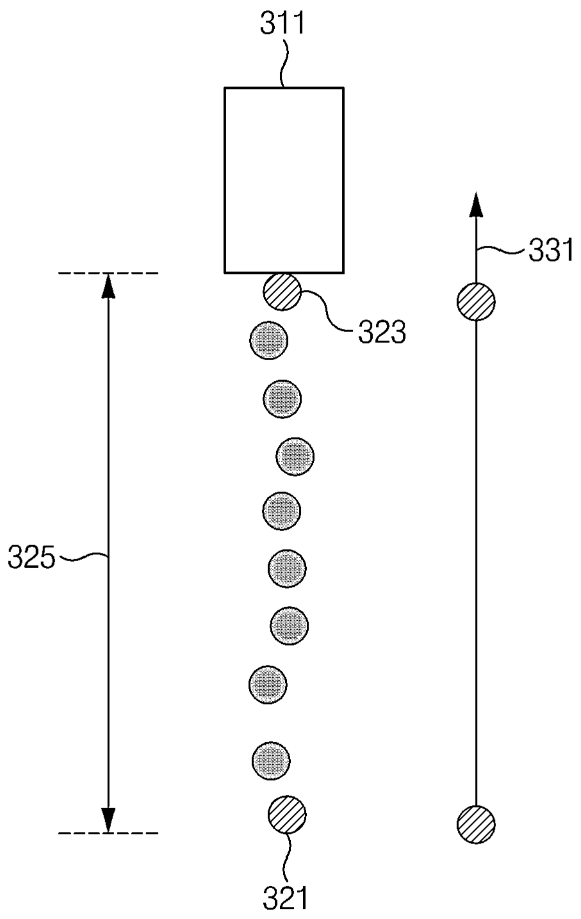
FIG. 3 shows an example of obtaining a heading direction of a virtual box, in an example of the present disclosure.

FIG. 3 shows an example of obtaining a heading direction of a virtual box, in an example of the present disclosure.

Referring to FIG. 3, a processor (e.g., a processor 110 of FIG. 1) of a vehicle control apparatus (e.g., a vehicle control apparatus 100 of FIG. 1) according to an example may identify datasets associated correspond a second external vehicle prior to a first time point, which are stored in a memory (e.g., a memory 130 of FIG. 1). For example, the datasets may include at least one of information associated with a virtual box corresponding to the second external vehicle or information associated with driving of the second external vehicle, or any combination thereof. For example, the information associated with the driving of the second external vehicle may include at least one of a driving path of the second external vehicle, a speed of the second external vehicle, or a driving direction of the second external vehicle, or any combination thereof. For example, the driving path of the second external vehicle may be generated by a reference point included in the virtual box corresponding to the second external vehicle. For example, the driving path of the second external vehicle may be generated by tracking the reference point, based on that a center point of the virtual box corresponding to the rear of the second external vehicle is the reference point.

In an example, the processor may obtain a heading direction of a virtual box 311 corresponding to the second external vehicle at the first time point, based on virtual track information representing the second external vehicle at the first time.

For example, the processor may identify a virtual driving path included in the virtual track information representing the second external vehicle at the first time point. For example, the virtual driving path may include points representing a driving path of the second external vehicle.

For example, the processor may identify a first point 321 and a second point 323 of the virtual driving path included in the virtual track information representing the second external vehicle at the first time point. For example, the first point 321 may be referred to as a start point included in the virtual track information. For example, the second point 323 may be referred to as an end point included in the virtual track information.

For example, the processor may obtain a heading direction 331 of the virtual box 311 corresponding to the second external vehicle at the first time point, based on the first point 321 and the second point 323. For example, the processor may identify the heading direction 331 of the virtual box 311, based on a half line which faces the second point 323 from the first point 321.

In an example, the processor may identify a distance 325 between the first point 321 and the second point 323. The processor may store the virtual track information, based on that the distance 325 between the first point 321 and the second point 323 is greater than a reference distance (e.g., 5 m). For example, the operation of storing the virtual track information may include the operations described above with reference to FIG. 2.

In an example, the processor may identify an angle of the heading direction 331 based on the first point 321 of second point 323. For example, the angle of the heading direction 331 may include an angle between a straight line corresponding to a first axis among the first axis, the second axis, and the third axis and the heading direction 331.

In an example, the processor may store the virtual track information including the heading direction 331, based on that the angle of the heading direction 331 is less than a reference angle (e.g., about 10-20 degrees).

For example, the processor may obtain virtual track information including the heading direction 331 and representing the second external vehicle at the first time point, based on obtaining the heading direction 331 of the virtual box 311. For example, the processor may store the virtual track information including the heading direction 331 in a memory (e.g., a memory 130 of FIG. 1), using the operations of FIG. 2.

In an example, the processor may output (or update) the stored virtual track information as track information representing the second external vehicle at the first time point.

As described above, the processor of the vehicle control apparatus according to an example may have the effect of accurately outputting the heading direction of the second external vehicle covered by the first external vehicle.

Figure 4:
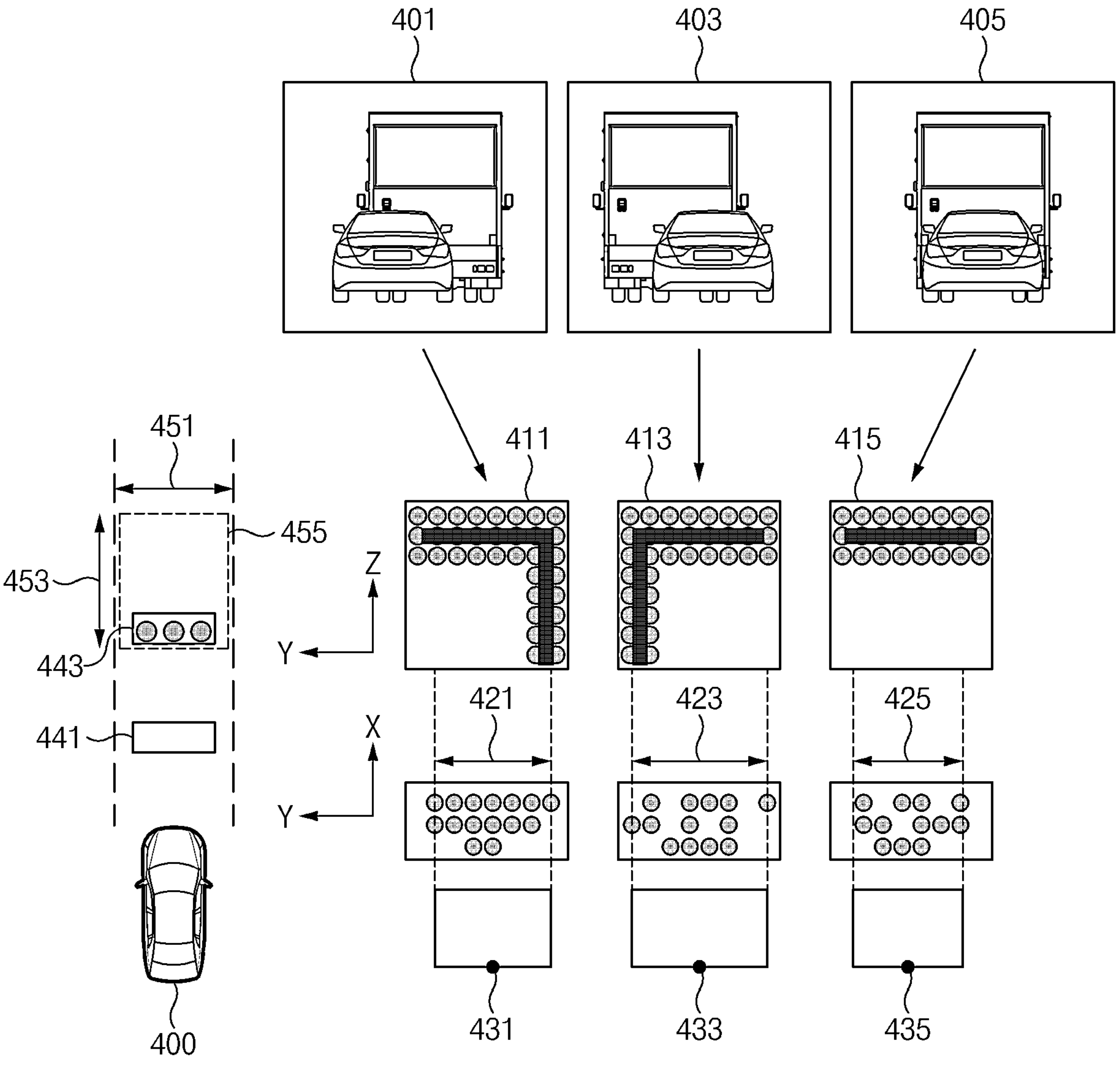
FIG. 4 shows an example of correcting a size of a virtual box and a position of a virtual box, in an example of the present disclosure.

FIG. 4 shows an example of correcting a size of a virtual box and a position of a virtual box, in an example of the present disclosure.

Referring to FIG. 4, a processor (e.g., a processor 110 of FIG. 1) of a vehicle control apparatus (e.g., a vehicle control apparatus 100 of FIG. 1) according to an example may obtain track information representing a second external vehicle which travels in front of a first external vehicle at a first time, by a sensor (e.g., LiDAR 120 of FIG. 1). The processor may obtain virtual track information corresponding to the second external vehicle, based on that the track information representing the second external vehicle at the first time point does not meet reference reliability. For example, the virtual track information may be obtained based on the track information representing the second external vehicle at the first time point and datasets corresponding to the second external vehicle, which are obtained by the LiDAR before the first time point. Specifically, virtual track information may be obtained by correcting at least part of the information about the virtual box corresponding to the second external vehicle from the track information. Information about the virtual box may be a track path tracking a second external vehicle, a first heading direction of the virtual box, and a location of the virtual box.

Each of a first example 401, a second example 403, and a third example 405 of FIG. 4 may include an example indicating a state in which the second external vehicle is covered by a first external vehicle which travels in front of a vehicle.

The first example 401 of FIG. 4 may include an example in which a left lower end of the second external vehicle is covered by the first external vehicle. The second example 403 of FIG. 4 may include an example in which a right lower end of the second external vehicle is covered by the first external vehicle. The third example 405 of FIG. 4 may include an example in which a lower end of the second external vehicle is covered by the first external vehicle.

In an example, the processor may correct a virtual box corresponding to the second external vehicle, in track information representing the second external vehicle at the first time.

Referring to the first example 401, in an example, the processor may identify the second external vehicle which travels in front of the first external vehicle. The processor may identify a virtual box 411 corresponding to the second external vehicle, in the track information representing the second external vehicle at the first time. For example, the virtual box 411 corresponding to the second external vehicle may be represented on a surface formed by a y-axis and a z-axis. For example, the processor may identify the virtual box 411 corresponding to the second external vehicle, the left lower end of which is covered by the first external vehicle.

For example, the processor may identify or determine a value of a width 421 of the virtual box 411. For example, the processor may identify or determine a value of the width 421 of the virtual box 411, based on the track information representing the second external vehicle at the first time point.

The processor may identify points corresponding to the width 421 of the virtual box 411. The processor may identify a reference point 431 corresponding to the center of the points corresponding to the width 421 of the virtual box 411. The processor may identify an x-coordinate of the reference point 431 corresponding to the width 421 of the virtual box 411. The processor may identify a position of a virtual box 455 included in the virtual track information, based on identifying the x-coordinate of the reference point 431. For example, the processor may use an x-coordinate on the position of the virtual box 455 included in the virtual track information as an x-coordinate of the reference point 431.

Referring to the second example 403, in an example, the processor may identify the second external vehicle which travels in front of the first external vehicle. The processor may identify a virtual box 413 corresponding to the second external vehicle, in the track information representing the second external vehicle at the first time. For example, the virtual box 413 corresponding to the second external vehicle may be represented on the surface formed by the y-axis and the z-axis. For example, the processor may identify the virtual box 413 corresponding to the second external vehicle, the right lower end of which is covered by the first external vehicle.

For example, the processor may identify a width 423 of the virtual box 413. For example, the processor may identify the width 423 of the virtual box 413, based on the track information representing the second external vehicle at the first time point.

The processor may identify points corresponding to the width 423 of the virtual box 413. The processor may identify a reference point 433 corresponding to the center of the points corresponding to the width 423 of the virtual box 413. The processor may identify an x-coordinate of the reference point 433 corresponding to the width 423 of the virtual box 413. The processor may identify a position of the virtual box 455 included in the virtual track information, based on identifying the x-coordinate of the reference point 433. For example, the processor may use an x-coordinate on the position of the virtual box 455 included in the virtual track information as an x-coordinate of the reference point 433.

Referring to the third example 405, in an example, the processor may identify the second external vehicle which travels in front of the first external vehicle. The processor may identify a virtual box 415 corresponding to the second external vehicle, in the track information representing the second external vehicle at the first time. For example, the virtual box 415 corresponding to the second external vehicle may be represented on the surface formed by the y-axis and the z-axis. For example, the processor may identify the virtual box 415 corresponding to the second external vehicle, the lower end of which is covered by the first external vehicle.

For example, the processor may identify a width 425 of the virtual box 415. For example, the processor may identify the width 425 of the virtual box 415, based on the track information representing the second external vehicle at the first time point.

The processor may identify points corresponding to the width 425 of the virtual box 415. The processor may identify a reference point 435 corresponding to the center of the points corresponding to the width 425 of the virtual box 415. The processor may identify an x-coordinate of the reference point 435 corresponding to the width 425 of the virtual box 415. The processor may identify a position of the virtual box 455 included in the virtual track information, based on identifying the x-coordinate of the reference point 435. For example, the processor may use an x-coordinate on the position of the virtual box 455 included in the virtual track information as an x-coordinate of the reference point 435.

In an example, the processor may identify a virtual box 441 corresponding to the first external vehicle. The processor may identify a virtual box 443 corresponding to the second external vehicle covered by the first external vehicle. The processor may correct the virtual box 443, based on that the virtual box 443 is not complete. For example, the processor may identify a width and a length of the virtual box 443, which are included in the track information representing the second external vehicle at the first time point. For example, the width of the virtual box 443 may include a length in the direction of the y-axis. For example, the length of the virtual box 443 may include a length in the direction of the x-axis.

For example, the processor may compare the width of the virtual box 443 with a reference width (e.g., about 1-3 m). The processor may select a first value which is larger between the width of the virtual box 443 and the reference width.

For example, the processor may compare the length of the virtual box 443 with a reference length (e.g., about 4-6 m). The processor may select a second value which is larger between the length of the virtual box 443 and the reference length.

For example, the processor may generate the virtual box 455 in which the size of the virtual box 443 is corrected, based on the first value and the second value. The processor may include the virtual box 455 with the corrected size in the virtual track information and may store the virtual track information in a memory (e.g., a memory 130 of FIG. 1). For example, the processor may store the virtual track information including the virtual box 455 with the corrected size in a buffer area of the memory.

In an example, the processor may identify a reference width 451 and a reference length 453. The processor may compare a width (e.g., 421, 423, or 425) of a virtual box identified from the track information representing the second external vehicle at the first time point with the reference width 451. The processor may identify a first value which is larger between the width of the virtual box identified from the track information representing the second external vehicle at the first time point and the reference width. The processor may identify points corresponding to the first value, based on obtaining the first value. For example, the processor may identify a center point of the points corresponding to the first value. The processor may identify a y-coordinate of the virtual box 455 included in the virtual track information, based on coordinates of the center point of the points corresponding to the first value.

In an example, the processor may identify a position of the virtual box 455 included in the virtual track information, based on the y-coordinate of the center point of the points corresponding to the first value and the x-coordinate included in the track information representing the second external vehicle at the first time.

For example, the processor may output (or update) the track information representing the second external vehicle at the first time point, based on the position of the virtual box 455 included in the virtual track information.

As described above, the processor of the vehicle control apparatus according to an example may output (or update) the track information representing the second external vehicle at the first time, based on the position of the virtual box 455 included in the virtual track information, thus having the effect of accurately representing the position of the second external vehicle at the first accurately tracking a driving path of the second external vehicle.

Figure 5:
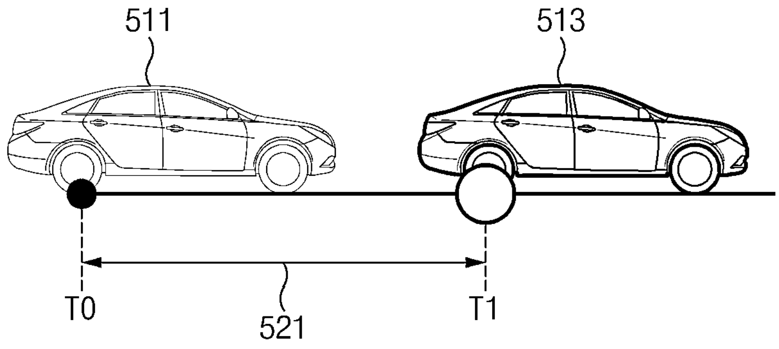
FIG. 5 shows an example of performing time compensation, in an example of the present disclosure.

FIG. 5 shows an example of performing time compensation, in an example of the present disclosure.

Referring to FIG. 5, a processor (e.g., a processor 110 of FIG. 1) of a vehicle control apparatus (e.g., a vehicle control apparatus 100 of FIG. 1) according to an example may update pieces of virtual track information stored in a memory (e.g., a memory 130 of FIG. 1). For example, the processor may update pieces of virtual track information obtained from a time point prior to a first time point to the first time point. For example, the processor may update the pieces of virtual track information obtained from the time point prior to the first time point to the first time point to be used at the first time point.

For example, the processor may perform time compensation for the pieces of virtual track information stored in the memory by being obtained from the time point prior to the first time point to the first time point to be used at the first time point.

For example, the processor may update pieces of virtual track information stored in the memory, based on displacement movement of a vehicle. For example, the processor may identify a reference time 521. For example, the reference time 521 may include a time when a vehicle travels from a first position 511 to a second position 513.

For example, the processor may perform time compensation for the pieces of virtual track information stored in the memory, using the reference time 521.

For example, the processor may perform time compensation for the pieces of virtual track information stored in the memory, using a first result value and a second result value obtained using Equations 1 and 2.

$$\delta_x = V_{vehLong} \times \Delta T \quad \text{[Equation 1]}$$

$$\delta_y = V_{vehLat} \times \Delta T \quad \text{[Equation 2]}$$

For example, in Equation 1 above, $\delta_x$ may be referred to as the first result value. For example, the Equation 1 above, $V_{vehLong}$ may include a longitudinal speed of the vehicle. For example, the Equation 1 above, $\Delta T$ may include the reference time 521.

For example, in Equation 2 above, $\delta_y$ may be referred to as the second result value. For example, the Equation 2 above, $V_{vehLat}$ may include a lateral speed of the vehicle. For example, the Equation 2 above, $\Delta T$ may include the reference time 521.

The processor may obtain a third result value and a fourth result value by using at least one of Equation 3 below or Equation 4 below, or any combination thereof, based on obtaining at least one of the first result value or the second result value, or any combination thereof.

$$x = x_{T_0} + \delta_x \quad \text{[Equation 3]}$$

$$y = y_{T_0} + \delta_y \quad \text{[Equation 4]}$$

For example, in Equation 3 above, x may include the third result value. For example, the Equation 3 above, $X_{T_0}$ may include an x-coordinate of the vehicle at time point $T_0$. For example, in Equation 3 above, $\delta_x$ may include the first result value.

For example, in Equation 4 above, y may include the fourth result value. For example, the Equation 4 above, $y_{T_0}$ may include a y-coordinate of the vehicle at time point $T_0$. For example, in Equation 4 above, $\delta_y$ may include the second result value.

In an example, the processor may correct a position of a second external vehicle identified at time point $T_0$ at time point $T_1$ by using at least one of the third result value, the fourth result value, or a yaw rate of the vehicle, or any combination thereof. For example, time point $T_1$ may include the first time point. For example, the processor may correct virtual track information obtained before the first time point, which is stored in the memory, by using at least one of Equation 5 below or Equation 6 below, or any combination thereof.

$$x_1 = x \times \cos\theta - y \times \sin\theta \quad \text{[Equation 5]}$$

$$y_1 = x \times \sin\theta + y \times \cos\theta \quad \text{[Equation 6]}$$

For example, in Equations 5 and 6, x may include the third result value obtained by using Equation 3 above. For example, in Equations 5 and 6, y may include the fourth result value obtained by using Equation 4 above. For example, in Equation 5 above, $x_1$ may include an x-coordinate in which an x-coordinate at time point $T_0$ is corrected at time point $T_1$. In Equation 6 above, $y_1$ may include a y-coordinate in which a y-coordinate at time point $T_0$ is corrected at time point $T_1$.

For example, the processor may correct a position of each of virtual boxes included in each of pieces of virtual track information obtained before the first time point, which are stored in the memory, at the first time point by using Equations 1 to 6 above.

The processor may obtain virtual track information corresponding to the second external vehicle at the first time point, using each of the pieces of virtual track information corrected at the first time point. The processor may output the virtual track information as track information representing the second external vehicle at the first time point, based on obtaining the virtual track information corresponding to the second external vehicle at the first time point.

As described above, the processor of the vehicle control apparatus according to an example may perform the time compensation for the pieces of virtual track information stored in the memory, thus accurately obtaining the virtual track information corresponding to the second external vehicle at the first time point, which is generated based on the pieces of virtual track information stored in the memory.

Figure 6:
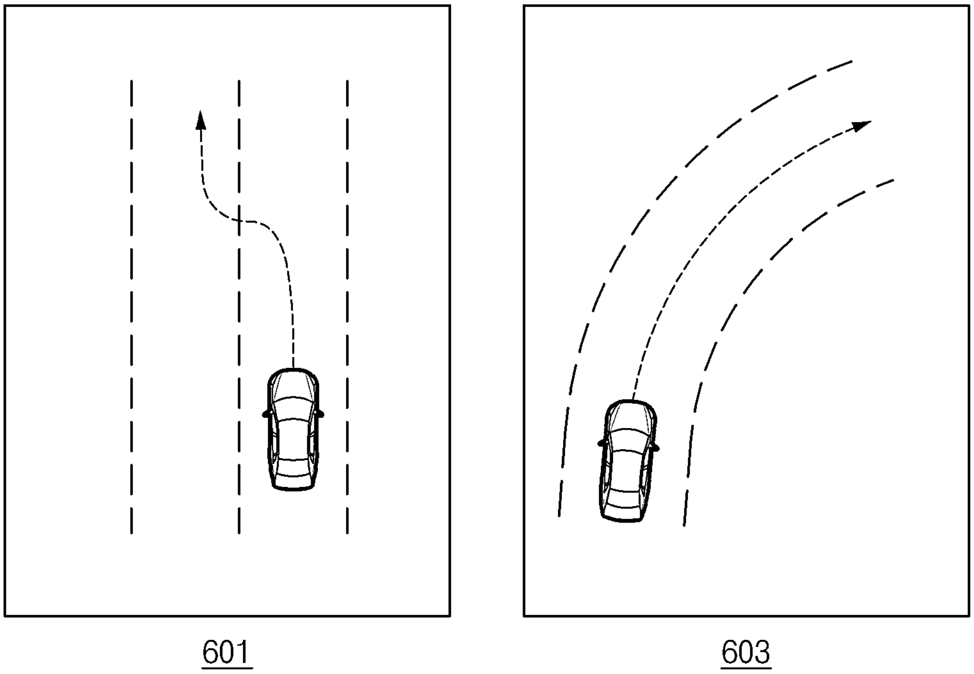
FIG. 6 shows an example in which a vehicle makes a lane change or travels in a curved section, in an example of the present disclosure.

FIG. 6 shows an example in which a vehicle makes a lane change or travels in a curved section, in a present disclosure. Referring to FIG. 6, a processor (e.g., a processor 110 of FIG. 1) of a vehicle control apparatus (e.g., a vehicle control apparatus 100 of FIG. 1) according to an example may identify that a vehicle makes a lane change or is traveling in a curved section.

Referring to a first example 601 of FIG. 6, the processor may identify that the vehicle makes a lane change. The processor may identify that the vehicle makes a lane change by using at least one of a speed of the vehicle, a yaw rate of the vehicle, or a sensor value of a gyro sensor, or any combination thereof.

Referring to a second example 603 of FIG. 6, the processor may identify that the vehicle is traveling in a curved section. For example, the processor may identify that the vehicle is traveling in a curved section, based on at least one of a speed of the vehicle, a yaw rate of the vehicle, or a sensor value of a gyro sensor, or any combination thereof.

For example, the processor may identify a curvature of the curved section. For example, the processor may identify whether the curvature of the curved section is greater than or equal to a reference curvature (e.g., about 300).

For example, if the vehicle makes the lane change or if the vehicle is traveling in the curved section which is greater than or equal to the reference curvature, the processor may fail to identify stability of track information representing a second external vehicle at a first time point.

For example, if the vehicle does not make the lane change or if the vehicle is traveling in the curved section which is less than or the reference curvature, the processor may identify the stability of the track information representing the second external vehicle at the first time point.

For example, if the vehicle does not make the lane change or if the vehicle is traveling in the curved section which is less than the reference curvature, the processor may identify the stability of the track information representing the second external vehicle at the first time point, based on that other conditions are met.

In an example, the processor may perform different operations, depending on the stability of the track information representing the second external vehicle at the first time. For example, the processor may output the track information representing the second external vehicle at the first time point, based on that the track information representing the second external vehicle at the first time point is stable. For example, the processor may output the obtained virtual track information as the track information representing the second external vehicle at the first time point, based on that the track information representing the second external vehicle at the first time point is not stable.

As described above, the processor of the vehicle control apparatus according to an example may perform a different operation depending on the stability of the track information, thus effectively tracking the second external vehicle.

Figure 7:
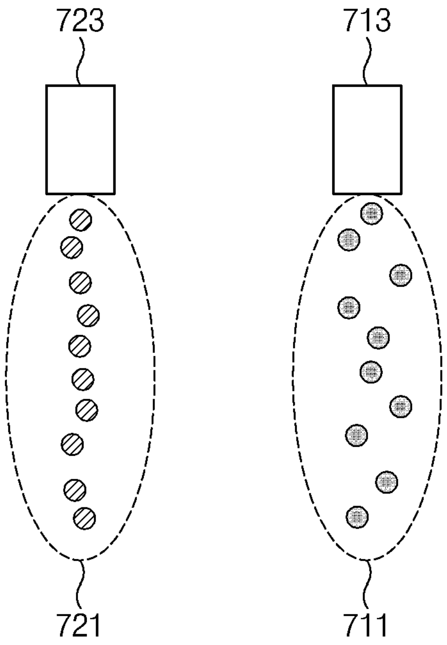
FIG. 7 shows an example of comparing a scatter plot of a track path with a scatter plot of a virtual track path, in an example of the present disclosure.

FIG. 7 shows an example of comparing a scatter plot of a track path with a scatter plot of a virtual track path, in an example of the present disclosure.

Referring to FIG. 7, a processor (e.g., a processor 110 of FIG. 1) of a vehicle control apparatus (e.g., a vehicle control apparatus 100 of FIG. 1) according to an example may identify a virtual box 713 included in track information representing a second external vehicle at a first time point. The processor may identify a track path 711 included in the track information representing the second external vehicle at the first time point.

For example, the processor may obtain virtual track information by correcting at least one of a virtual box 713 included in the track information representing the second external vehicle at the first time point or the track path 711, or any combination thereof. For example, the processor may identify a virtual box 723 the virtual track information obtained by correcting the track information representing the second external vehicle at the first time point. For example, the processor may identify a virtual track path 721 included in the virtual track information.

For example, the processor may identify a scatter plot of the track path 711. For example, the processor may identify a scatter plot of the virtual track path 721. For example, the scatter plot may include at least one of dispersion, a standard deviation, a range, an interquartile range, an absolute deviation, a coefficient of variation, or deflection, or any combination thereof.

For example, the processor may identify a scatter plot, using Equations below.

$$x = X_{t-i} - X_{t-i-1} \qquad \text{[Equation 7]}$$

For example, in equation 7 above, $X_{t-i}$ may include an x-coordinate of the virtual box 713 or the virtual box 723 identified at time point t–i. For example, in equation 7 above, $X_{t-i-}1$ may include an x-coordinate of the virtual box 713 or the virtual box 723 identified at time point t–i–1. For example, in Equation 7 above, x may include a difference between the x-coordinate of the virtual box 713 or the virtual box 723 at time point t–i and the x-coordinate of the virtual box 713 or the virtual box 723 at time point t–i–1.

$$\text{bias}(x) = \frac{\sum_{i=0}^{N-1} x_i}{N} \qquad \text{[Equation 8]}$$

For example, in Equation 8 above, $x_i$ may include a result value obtained using Equation 7 above. For example, in Equation 8 above, N may include the number of pieces of virtual track information stored in a buffer area of a memory. For example above, N may include the number of pieces of track information corresponding to the pieces of virtual track information stored in the buffer area of the memory. For example, in Equation 8 above, bias(x) may include a result value indicating deflection.

$$\sigma_x = \frac{\sum_{i-1}^{N-1} (x_i - \text{bias}(x))^2}{N-1} \qquad \text{[Equation 9]}$$

For example, in Equation 9 above, $x_i$ may include a result value obtained by Equation 7 above. For example, in Equation 9 above, bias(x) may include a result value obtained by Equation 8 above. For example, in Equation 9 above, $\sigma_x$ may include a result value indicating a standard deviation.

In an example, the processor may obtain at least one of a standard deviation of the track path 711 or a standard deviation of the virtual track path 721, or any combination thereof by using Equations 7 to 9 above. The processor may identify whether the standard deviation of the track path 711 is greater than or equal to a threshold (e.g., about 0.2 m). The processor may identify whether the standard deviation of the virtual track path 721 is less than the threshold (e.g., about 0.2 m).

For example, the processor may output virtual track information including the virtual track path 721 as the track information representing the second external vehicle at the first time, based on that the standard deviation of the track path 711 is greater than or equal to the threshold and if the standard deviation of the virtual track path 721 is less than the threshold.

For example, the processor may output the track information representing the second external vehicle at the first time, which includes the track path 711, as track information, based on that the standard deviation of the track path 711 is less than the threshold and if the standard deviation of the virtual track path 721 is greater than or equal to the threshold.

As described above, the processor of the vehicle control apparatus according to an example may perform a different operation depending on stability of the track information, thus outputting information more accurately representing the second external vehicle at the first time point.

Figure 8:
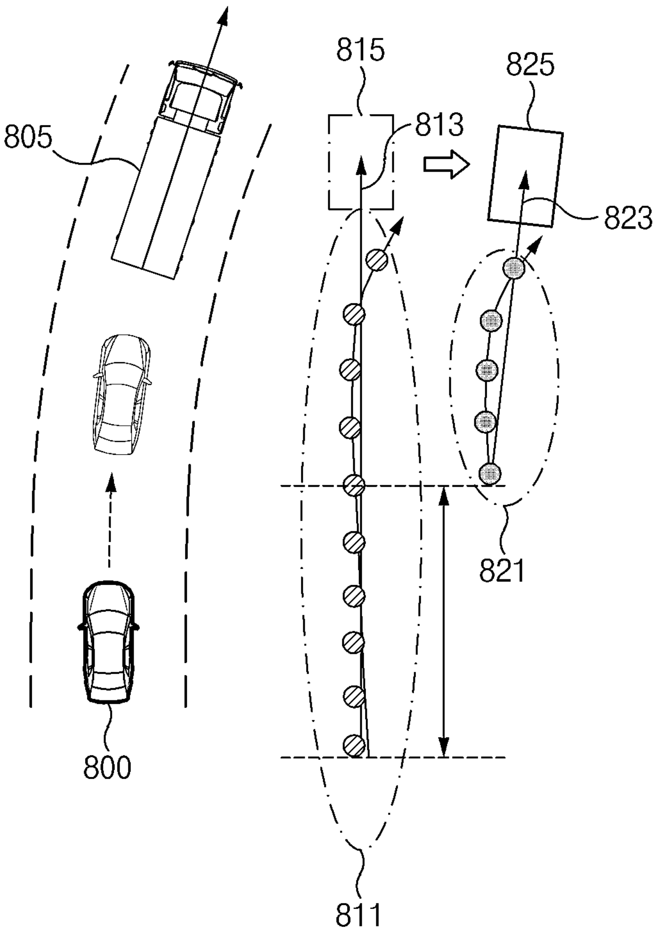
FIG. 8 shows an example in which a vehicle travels in a curved section, in an example of the present disclosure.

FIG. 8 shows an example in which a vehicle travels in a curved section, in an example of the present disclosure.

Referring to FIG. 8, a processor (e.g., a processor 110 of FIG. 1) included in a vehicle control apparatus (e.g., a vehicle control apparatus 100 of FIG. 1) according to an example may identify that a vehicle 800 is traveling in a curved section.

In an example, the processor may identify a second external vehicle 805 which travels in front of a first external vehicle. The processor may identify a virtual box 815 corresponding to the second external vehicle 805. For example, the virtual box 815 may be included in virtual track information generated by correcting at least a portion of track information representing the second external vehicle 805 at a first time point.

The processor may identify a virtual track path 811 included in the virtual track information. For example, the virtual track path 811 may be included in the virtual track information generated by correcting the at least a portion of the track information representing the second external vehicle 805 at the first time point.

In an example, the processor may identify a heading direction 813 using the virtual track path 811. The processor may identify the heading direction 813 using points which are included in the virtual track path 811 and represent a driving path of the second external vehicle 805. However, if the vehicle 800 is traveling in a curved section, the processor may generate a virtual track path using some points included in the virtual track path 811.

In an example, the processor may identify that the vehicle 800 is traveling in the curved section. The processor may select at least a portion of the virtual track path 811, based on that the vehicle 800 is traveling in the curved section. For example, the processor may select at least a portion of the virtual track path 811 indicating the driving path of the second external vehicle 805 from a second time point prior to the first time point to the first time point.

For example, the processor may select a virtual track path 821 from a third time point between the second time point and the first time point to the first time point. The processor may obtain a heading direction 823, based on the selected virtual track path 821. The processor may obtain a virtual box 825 in which the virtual box 815 is corrected, based on obtaining the heading direction 823.

In an example, if the vehicle 800 is traveling in the curved section, the processor may obtain virtual track information including at least one of the virtual box 825 or the virtual track path 821, or any combination thereof. The processor may store the virtual track path in a buffer area of a memory (e.g., a memory 130 of FIG. 1), based on obtaining the virtual track information. The processor may output the virtual track information as the track information representing the second external vehicle at the first time point, based on obtaining the virtual track information.

As described above, the processor of the vehicle control apparatus according to an example may obtain the virtual track information corresponding to the second external vehicle 805, using a portion of the virtual track path included in the virtual track information in the curved section, thus relatively better representing a driving path of the second external vehicle 805 at the first time point.

Figure 9:
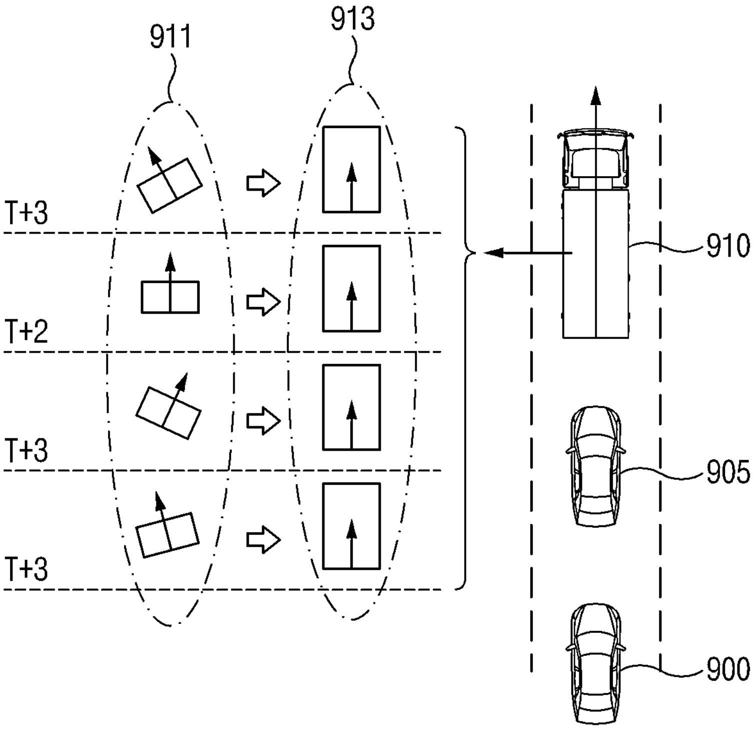
FIG. 9 shows an example of correcting a heading direction of a virtual box corresponding to a second external vehicle, in an example of the present disclosure.

FIG. 9 shows an example of correcting a heading direction of a virtual box corresponding to a second external vehicle, in an example of the present disclosure.

Referring to FIG. 9, while a vehicle 900 is traveling, a processor (e.g., a processor 110 of FIG. 1) included in a vehicle control apparatus (e.g., a vehicle control apparatus 100 of FIG. 1) according to an example may identify a first external vehicle 905 which travels in front of the vehicle 900. While the vehicle 900 is traveling, the processor may identify a second external vehicle 910 which travels in front of the vehicle 900 and the first external vehicle 905.

For example, the processor may obtain track information representing the second external vehicle 910 at a specific time point. For example, the processor may identify a virtual box corresponding to the second external vehicle 910, which is included in the track information representing the second external vehicle 910 at the specific time point, and a heading direction of the virtual box.

The virtual box corresponding to the second external vehicle 910 and the heading direction of the virtual box, which are identified at time points T, T+1, T+2, and T+3, may be represented as a first example 911. The processor may correct the virtual box corresponding to the second external vehicle 910 and the heading direction of the virtual box, which are represented as the first example 911, as shown in a second example 913. For example, the second example 913 may be associated with the virtual box corresponding to the second external vehicle 910 at the specific time point, which is included in the virtual track information, and the heading direction of the virtual box.

Figure 10:
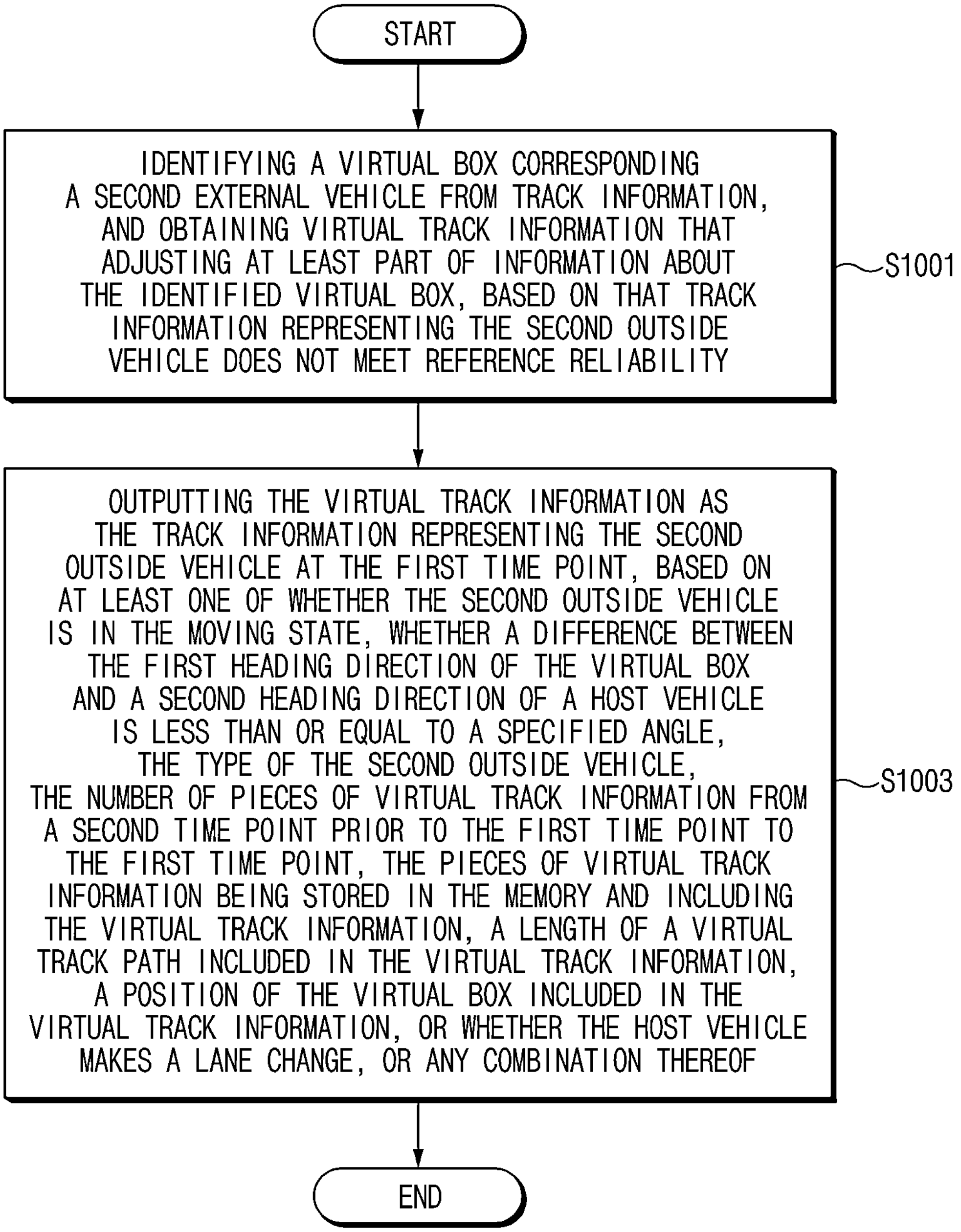
FIG. 10 shows an example of a flowchart associated with a vehicle control method according to an example of the present disclosure.

Hereinafter, a description will be given in detail of a vehicle control method according to an example of the present disclosure with reference to FIG. 10. FIG. 10 shows an example of a flowchart associated with a vehicle control method according to an example of the present disclosure.

Hereinafter, it is that a vehicle control apparatus 100 of FIG. 1 performs a process of FIG. 10. Furthermore, in a description of FIG. 10, an operation described as being performed by a processor may be understood as being controlled by a processor 110 of the vehicle control apparatus 100.

At least one of the operations of FIG. 10 may be performed by the vehicle control apparatus 100 of FIG. 1. The respective operations of FIG. 10 may be sequentially performed, but are not necessarily sequentially performed. For example, an order of the respective operations may be changed, and at least two operations may be performed in parallel.

Referring to FIG. 10, in S1001, the vehicle control method according to an example may include identifying a virtual box corresponding a second external vehicle from track information, and obtaining virtual track information that adjusting at least part of information about the identified virtual box, based on that track information representing the second outside vehicle does not meet reference reliability.

In S1001, according to an embodiment, If the track information representing the second external vehicle does not satisfy the reference reliability, additional operations may be performed before acquiring the virtual track information. Specifically, it may be identified whether at least one of the type of the second external vehicle, the second heading direction of the virtual box corresponding to the second external vehicle, or a combination thereof satisfies a specified condition. If it is identified as satisfying the specified conditions, virtual track information can be obtained. For example, the vehicle control method may include obtaining the virtual track information, based on that the second external vehicle is in the moving state and there is track information representing the second external vehicle at the first time point, which does not meet the reference reliability, that the type of the second external vehicle is a passenger vehicle, a commercial vehicle, or an unknown type of vehicle, and that the virtual box is in a lateral movement state or the first heading direction of the virtual box is not the same direction as the vehicle.

For example, the vehicle control method may include deleting pieces of virtual track information from a second time point to the first time point, which are stored in a memory (e.g., a memory 130 of FIG. 1) and include the virtual track information, without obtaining the virtual track information, based on that the second external vehicle is in the moving state and there is the track information representing the second external vehicle at the first time point, which does not meet the reference reliability, that the type of the second external vehicle is not the passenger vehicle, the commercial vehicle, and the unknown type of vehicle, or that the virtual box is not in the lateral movement state and that the first heading direction of the virtual box is the same direction as the vehicle.

In an example, the vehicle control method may include correcting a position of the virtual box at the first time point, based on the track information representing the second external vehicle at the first time point and each of positions of the virtual box, which are included in each of datasets corresponding to the second external vehicle from the second time point to the first time point, which are stored in the memory.

In an example, the vehicle control method may include obtaining track information representing the second external vehicle at the first time point and a third heading direction in which the first heading direction of the virtual box is which is included in each of the datasets corrected, corresponding to the second external vehicle from the second time point to the first time point, which are stored in the memory.

The vehicle control method may include obtaining the virtual track information, based on the corrected position of the virtual box at the first time point and the third heading direction.

The vehicle control method according to an example may include storing the obtained virtual track information in the memory, based on that the second external vehicle is in the moving state, that a difference between the first heading direction of the virtual box and a second heading direction of the vehicle is less than or equal to a specified angle, that the type of the second external vehicle is classified as a vehicle, that the number of the pieces of track information stored in the memory is greater than or equal to a reference number, that the length of the virtual track path included in the virtual track information is greater than a reference length, that the position of the virtual box is present in a specified area, or that the vehicle does not make a lane change.

The vehicle control method according to an example may include identifying a first scatter plot of first tracking points included in the virtual track information and a second scatter plot of second tracking points included in the track information representing the second external vehicle at the first time point, based on obtaining by the virtual track information.

For example, the vehicle control method may include storing the virtual track information in the memory, based on that the first scatter plot is less than a reference scatter plot and that the second scatter plot is greater than or equal to the reference scatter plot.

In an example, the virtual box may include a first virtual box. In an example, the vehicle control method may include selecting a first value which is relatively larger between a width of the first virtual box, which is obtained by the plurality of points corresponding to the second external vehicle at the first time point, and a reference width. For example, the vehicle control method may include selecting a second value which is relatively larger between a length of the first virtual box, which is obtained by the plurality of points corresponding to the second external vehicle at the first time point, and a reference length. The vehicle control the method may include generating a second virtual box in which the size of the first virtual box is corrected, based on the first value and the second value.

The vehicle control method according to an example may include identifying first coordinates in the direction of a second axis among a first axis, the second axis, and a third axis, based on a third point corresponding to the center of a segment formed by a first point and a second point corresponding to the first value. The vehicle control method may include identifying a position of the second virtual box, based on the first coordinates in the direction of the second axis and second coordinates in the direction of the first axis of the first virtual box included in the track information representing the second external vehicle at the first time, which does not meet the reference reliability.

The vehicle control method according to an example may include storing each of the pieces of virtual track information, using a moving-window scheme, depending on a time when each of the pieces of virtual track information from the second time point to the first time point, which are stored in the memory and include the virtual track information, is obtained.

The vehicle control method according to an example may include performing time compensation for each of the pieces of virtual track information stored in the memory, based on at least one of a longitudinal speed of the vehicle, a lateral speed of the vehicle, a reference time, a yaw rate of the vehicle, or coordinates of the virtual box corresponding to the second external vehicle at the first time point, or any combination thereof.

The vehicle control method according to an example may include identifying that the vehicle enters a curved section, based on at least one of a speed of the vehicle or a yaw rate of the vehicle, or any combination thereof. The vehicle control method may include correcting at least one of the first heading direction of the virtual box, the position of the virtual box, the size of the virtual box, or the track path tracking the second external vehicle, or any combination thereof, based on a portion of the virtual track path included in the virtual track information.

In S1003, the vehicle control method according to an example may include outputting the virtual track information as the track information representing the second external vehicle at the first time point, based on at least one of whether the second external vehicle is in the moving state, whether the difference between the first heading direction of the virtual box and the second heading direction of the vehicle is less than or equal to the specified angle, the type of the second external vehicle, the number of pieces of virtual track information from a second time point prior to the first time point to the first time point, which are stored in the memory and include the virtual track information, a position of the virtual box included in the virtual track information, or whether the vehicle makes a lane change, or any combination thereof.

Figure 11:
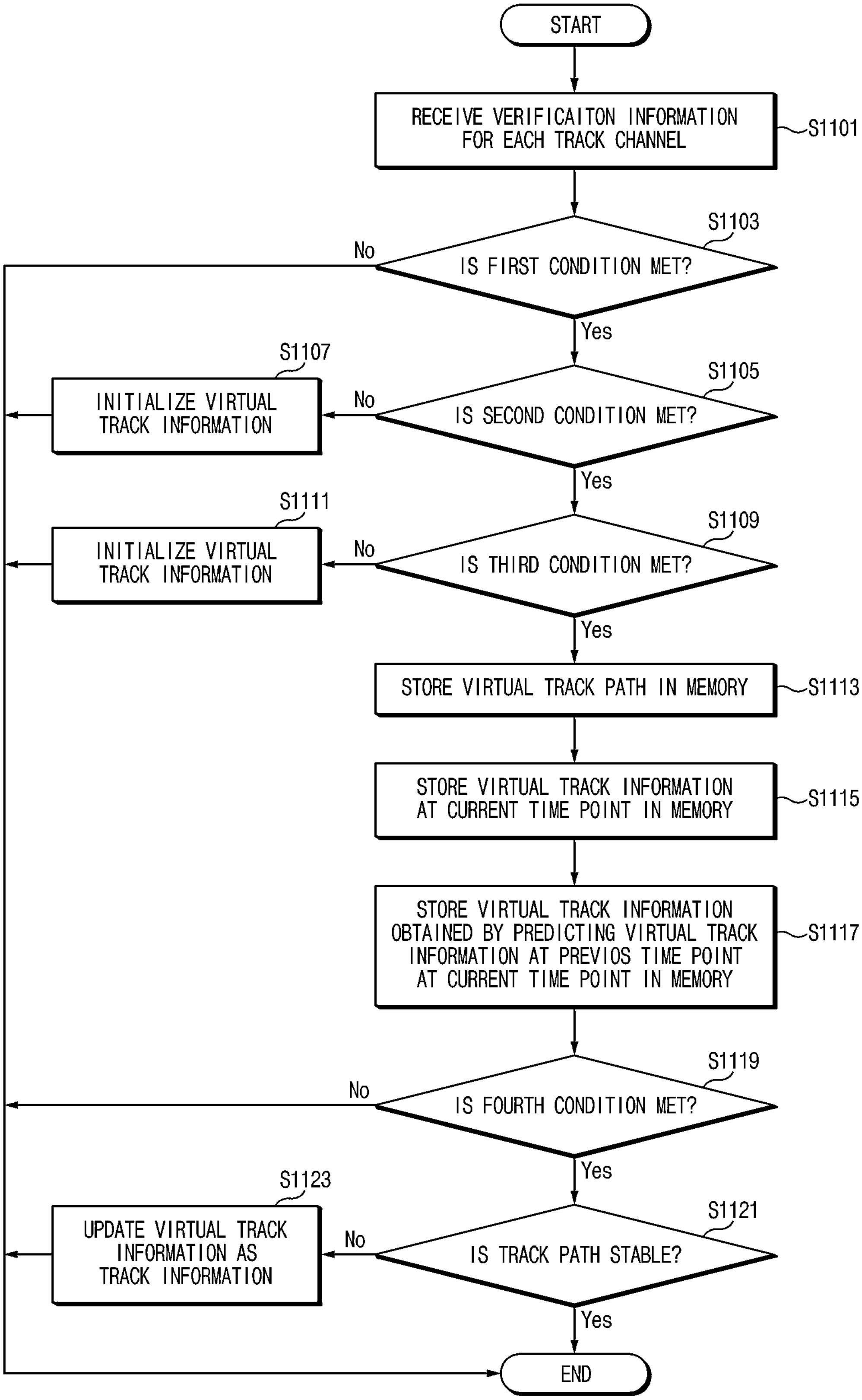
FIG. 11 shows an example of a flowchart associated with a vehicle control method including receiving verification information for each track channel, according to an example of the present disclosure.

Hereinafter, a description will be given in detail of a vehicle control method according to an example of the present disclosure with reference to FIG. 11. FIG. 11 shows an example of a flowchart associated with a vehicle control method according to an example of the present disclosure.

Hereinafter, it is assumed that a vehicle control apparatus 100 of FIG. 1 performs a process of FIG. 11. Furthermore, in a description of FIG. 11, an operation described as being performed by an apparatus may be understood as being controlled by a processor 110 of the vehicle control apparatus 100.

At least one of the operations of FIG. 11 may be performed by the vehicle control apparatus 100 of FIG. 1. The respective operations of FIG. 11 may be sequentially performed, but are not necessarily sequentially performed. For example, an order of the respective operations may be changed, and at least two operations may be performed in parallel. Additionally, the vehicle control method according to one embodiment may not include all of the operations in FIG. 11. For example, the vehicle control method may start with the operation of storing virtual track information in memory (operation S1113).

Referring to FIG. 11, in S1101, the vehicle control method according to an example may include receiving verification information for each track channel from LiDAR (e.g., LiDAR 120 of FIG. 1). For example, the verification information for each track channel may include each of pieces of information generated based on verifying datasets obtained while tracking external vehicles. For example, the track channel may include a partial area of a memory corresponding to an external vehicle.

In S1103, the vehicle control method according to an example may include identify whether a first condition is met.

For example, the first condition may be associated with that a track is a moving object and there is track verification information. For example, that the first condition is met may be that the track is the moving object and there is the track verification information. For example, that the first condition is not met may be that the track is a static object or there is no track verification information. For example, the track may include the meaning of referring to an external object which is being tracked using the LiDAR.

If the first condition is met (Yes of S1103), in S1105, the vehicle control method according to an example may include identifying whether a second condition is met.

For example, the second condition may be associated with whether the classification information (or the type) of the external object which is being tracked is one of an unknown vehicle, a passenger vehicle, or a commercial vehicle. For example, that the second condition is met may be that the classification information of the external object which is being tracked is identified as one of the unknown vehicle, the passenger vehicle, or the commercial vehicle. For example, that the second condition is not met may include that the classification information of the external object which is being tracked is identified as not the unknown vehicle, the passenger vehicle, and the commercial vehicle.

If the second condition is not met (No of S1105), in S1107, the vehicle control method according to example may include initializing virtual track information. For example, if the second condition is not met, the vehicle control method may include deleting some or all of pieces of virtual track information stored in the memory.

If the second condition is met (Yes of S1105), in S1109, the vehicle control method according to an example may include identifying whether a third condition is met.

For example, the third condition may be associated with whether the virtual box corresponding to the second external vehicle is in a lateral movement state or whether a heading direction of the virtual box is not the same direction as the vehicle.

For example, that the third condition is met may include that the virtual box corresponding to the second external vehicle is in the lateral movement state or that the heading direction of the virtual box is not the same direction as the vehicle. For example, that the third condition is not met may include that the virtual box corresponding to the second external vehicle is not in the lateral movement state and that the heading direction of the virtual box is the same direction as the vehicle.

If the third condition is not met (No of S1109), in S1111, the vehicle control method according to example may include initializing virtual track information. For example, initializing the virtual track information in S1111 may include initializing the virtual track information in S1107.

If the third condition is met (Yes of S1109), in S1113, the vehicle control method according to example may include storing a virtual track path in the memory. For example, the virtual track path may be generated based on correcting at least a portion of a track path included in the verification information for each track channel. For example, the virtual track path may be generated based on correcting at least a portion of a track path identified while tracking an external vehicle.

In S1115, the vehicle control method according to an example may include storing virtual track information at a current time point in the memory. For example, the vehicle control method may include storing the virtual track information at the current time point, which includes the virtual track path obtained in S1113, in the memory.

In S1117, the vehicle control method according to an example may include storing virtual track information obtained by predicting virtual track information at a previous time point at the current time point in the memory. For example, the vehicle control method may include obtaining the virtual track information predicted at the current time point, based on performing time compensation for the virtual track information at the previous time point. The vehicle control method may include storing the virtual track information predicted at the current time point in the memory by obtaining the virtual track information predicted at the current time point, based on performing the time compensation for the virtual track information at the previous time point.

In S1119, the vehicle control method according to an example may include identify whether a fourth condition is met.

For example, the fourth condition may be associated with at least one of whether the track is a moving object, whether the heading direction of the virtual box is the same direction as the vehicle, classification information, the number of pieces of virtual track information stored in the memory, a length of a virtual track path included in the virtual track information, a position of the track, or a state in which the vehicle is traveling, or any combination thereof.

For example, that the fourth condition is met may include that the track is the moving body, that the heading direction of the virtual box is the same direction as the vehicle, that the classification information is a vehicle, that the number of the pieces of virtual track information stored in the memory corresponds to a reference number (e.g., about 20), that the length of the virtual track path included in the virtual track information is greater than a reference length (e.g., about 5 m), that the position of the track is present at a specified position, that the vehicle does not make a lane change, and the vehicle is traveling above a specified curvature.

For example, that the fourth condition is not met may include at least one of that the track is not the moving body, that the heading direction of the virtual box is not the same direction as the vehicle, that the classification information is not the vehicle, that the number of the pieces of virtual track information stored in the memory does not correspond to the reference number, that the length of the virtual track path included in the virtual track information is less than or equal to the reference length, that the position of the track is not present at the specified position, that the vehicle makes the lane change, or that the vehicle is traveling below the specified curvature.

If the fourth condition is met (Yes of S1119), in S1121, the vehicle control method according to an example may include identifying whether the track path is stable.

For example, whether the track path is stable may be identified based on a scatter plot of tracking points included in the track path.

For example, if the scatter plot of the tracking points included in the track path is greater than or equal to a reference scatter plot, it may be identified that the track path is not stable. For example, if the scatter plot of the tracking points included in the track path is less than the reference scatter plot, it may be identified that the track path is stable.

If the track path is not stable (No of S1121), in S1123, the vehicle control method according to example may include updating the virtual track information as track path. For example, updating the virtual track information as the track information may include outputting the virtual track information as the track information.

If the fourth condition is not met (No of S1119) or if the track path is stable (Yes of S1121), the vehicle control method according to an example may include ending the process.

Figure 12:
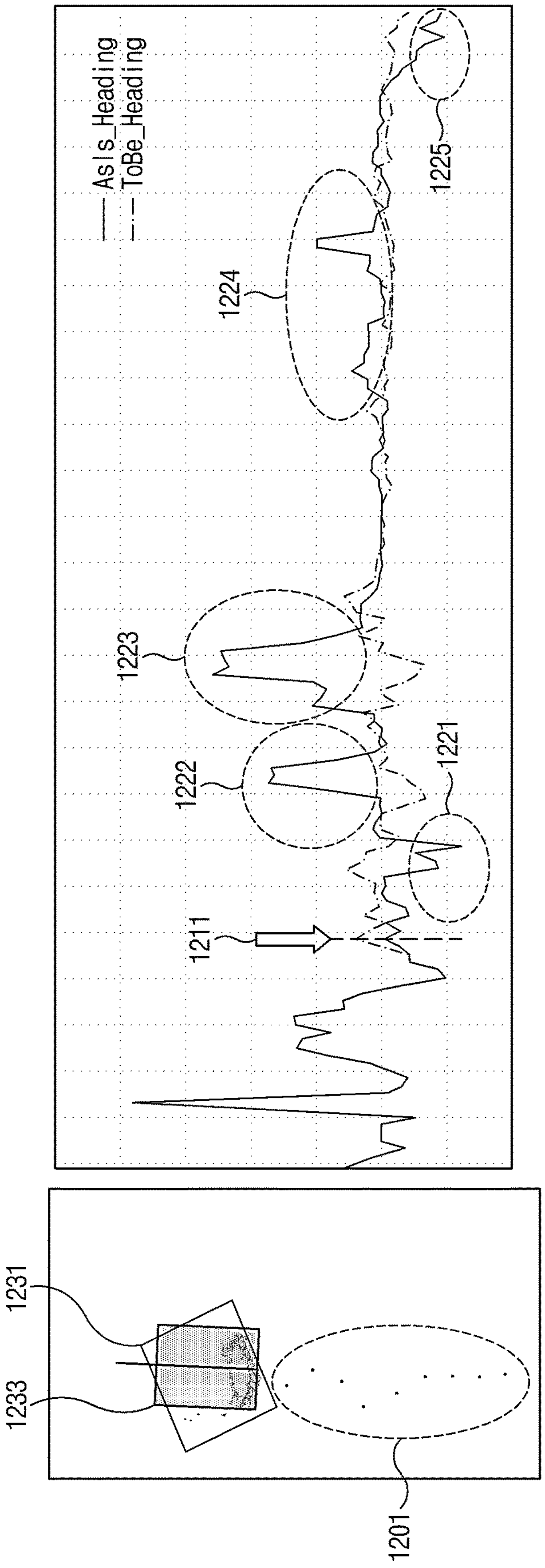
FIG. 12 shows an example of a result to which the present disclosure is applied.

FIG. 12 shows an example of a result to which the present disclosure is applied.

Referring to FIG. 12, a processor (e.g., a processor 110 of FIG. 1) of a vehicle control apparatus (e.g., a vehicle control apparatus 100 of FIG. 1) according to an example may identify a first virtual box 1231 from track information representing a second external vehicle covered by a first external vehicle.

In an example, the processor may obtain virtual track information by changing at least one of a first heading direction of the first virtual box 1231 included in the track information, a track path included in the track information, which tracks the second external vehicle, or a size of the first virtual box 1231, or any combination thereof, based on that the track information representing the second external vehicle covered by the first external vehicle does not meet reference reliability.

For example, the processor may obtain a second virtual box 1233 by changing at least one of the first heading direction of the first virtual box 1231 or the size of the first virtual box 1231, or any combination thereof. For example, the processor may obtain a virtual track path 1201 by changing the track path included in the track information, which tracks the second external vehicle.

In an example, the processor may obtain virtual track information from a time point 1211 if the track information representing the second external vehicle covered by the first external vehicle does not meet the reference reliability.

Referring to FIG. 12, the processor may output pieces of virtual track information respectively corresponding to time points 1221, 1222, 1223, 1224, and 1225 if the first heading direction of the first virtual v box 1231 is greater than a threshold as the track information representing the second external vehicle at the time points 1221, 1222, 1223, 1224, and 1225, thus stably outputting a second heading direction of the second virtual box 1233 corresponding to the second external vehicle.

Figure 13:
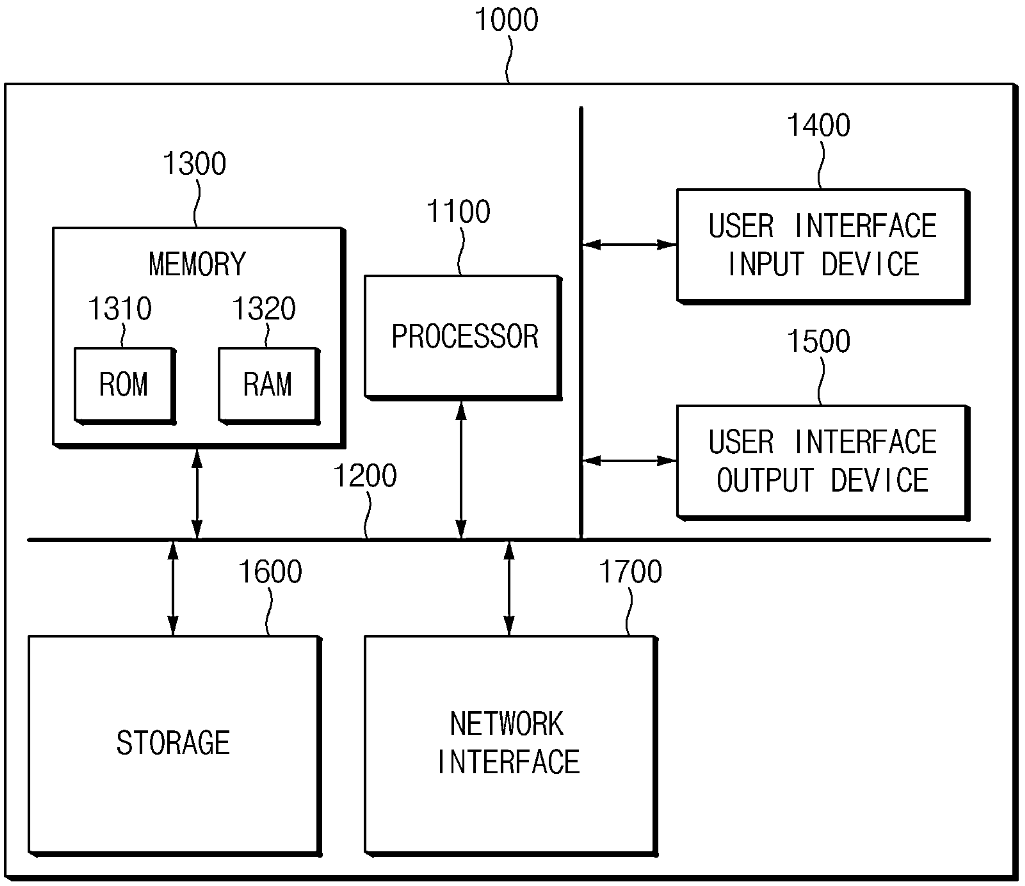
FIG. 13 shows an example of a computing system associated with a vehicle control apparatus or a vehicle control method according to an example of the present disclosure.

FIG. 13 shows an example of a computing system associated with a vehicle control apparatus or a vehicle control method according to an example of the present disclosure.

Referring to FIG. 13, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the examples disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may accurately track a second external vehicle which travels in front of a first external vehicle.

The present disclosure has been made to solve the above-mentioned problems occurring in the prior art while advantages achieved by the prior art are maintained intact.

An example of the present disclosure provides a vehicle control apparatus for accurately tracking a second external vehicle which travels in front of a first external vehicle and a method thereof.

Another example of the present disclosure provides a vehicle control apparatus for generating virtual track information by using track information representing a second external vehicle which travels in front of a first external vehicle and outputting the generated virtual track information as the track information representing the second external vehicle and a method thereof.

Another example of the present disclosure provides a vehicle control apparatus for stably outputting a heading direction of a virtual box corresponding to a second external vehicle covered by a first external vehicle, a position of the virtual box corresponding to the second external vehicle, and a track path tracking the second external vehicle and a method thereof.

The technical problems to be solved by the present disclosure are not limited to the aforementioned problems, and any other technical problems not mentioned herein will be clearly understood from the following description by those skilled in the art to which the present disclosure pertains.

According to an example of the present disclosure, a vehicle control apparatus may include light detection and ranging (LiDAR), a memory, and a processor. The processor may identify whether at least one of whether a second external vehicle at a first time, the second external vehicle traveling in front of a first external vehicle obtained by the LiDAR, is in a moving state, a type of the second external vehicle, or a first heading direction of a virtual box corresponding to the second external vehicle, or any combination thereof meets a specified condition, based on that track information representing the second external vehicle does not meet reference reliability, may obtain virtual track information by correcting at least one of a track path tracking the second external vehicle, the first heading direction of the virtual box, or a position of the virtual box, or any combination thereof, based on that the specified condition is met, and may output the virtual track information as the track information representing the second external vehicle at the first time point, based on at least one of whether the second external vehicle is in the moving state, whether a difference between the first heading direction of the virtual box and a second heading direction of a vehicle is less than or equal to a specified angle, the type of the second external vehicle, the number of pieces of virtual track information from a second time point prior to the first time point to the first time point, the pieces of virtual track information being stored in the memory and including the virtual track information, a length of a virtual track path included in the virtual track information, a position of the virtual box included in the virtual track information, or whether the vehicle makes a lane change, or any combination thereof.

In an example, the processor may obtain the virtual track information, based on that the second external vehicle is in the moving state and there is the track information representing the second external vehicle at the first time point, the track information not meeting the reference reliability, that the type of the second external vehicle is a passenger vehicle, a commercial vehicle, or an unknown type of vehicle, and that the virtual box is in a lateral movement state or the first heading direction of the virtual box is not the same direction as the vehicle.

In an example, the processor may delete the pieces of virtual track information from the second time point to the first time point, the pieces of virtual track information being stored in the memory and including the virtual track information, without obtaining the virtual track information, based on that the second external vehicle is in the moving state and there is the track information representing the second external vehicle at the first time point, the track information not meeting the reference reliability, that the type of the second external vehicle is not a passenger vehicle, a commercial vehicle, or an unknown type of vehicle, or that the virtual box is not in a lateral movement state and the first heading direction of the virtual box is the same direction as the vehicle.

In an example, the processor may correct a position of the virtual box at the first time point, based on the track information representing the second external vehicle at the first time point and each of positions of the virtual box, the positions being included in each of datasets corresponding to the second external vehicle from the second time point to the first time point, the datasets being stored in the memory, may obtain the track information representing the second external vehicle at the first time point and a third heading direction in which the first heading direction of the virtual box is corrected, the first heading direction is included in each of the datasets corresponding to the second external vehicle from the second time point to the first time point, the datasets being stored in the memory, and may obtain the virtual track information, based on the corrected position of the virtual box at the first time point and the third heading direction.

In an example, the processor may store the obtained virtual track information in the memory, based on that the second external vehicle is in the moving state, that the difference between the first heading direction of the virtual box and the second heading direction of the vehicle is less than or equal to the specified angle, that the type of the second external vehicle is classified as a vehicle, that the number of the pieces of virtual track information stored in the memory is greater than or equal to a reference number, that the length of the virtual track path included in the virtual track information is greater than a reference length, that the position of the virtual box is present in a specified area, and that the vehicle does not make the lane change.

In an example, the processor may identify a first scatter plot of first tracking points included in the virtual track information and a second scatter plot of second tracking points included in the track information representing the second external vehicle at the first time point, based on obtaining the virtual track information, and may store the virtual track information in the memory, based on that the first scatter plot is less than a reference scatter plot and that the second scatter plot is greater than or equal to the reference scatter plot.

In an example, the virtual box may include a first virtual box. The processor may select a first value being relatively larger between a width of the first virtual box, the width being obtained by a plurality of points corresponding to the second external vehicle at the first time point, and a reference width, may select a second value being relatively larger between a length of the first virtual box, the length being obtained by the plurality of points corresponding to the second external vehicle at the first time point, and a reference length, and may generate a second virtual box in which a size of the first virtual box is corrected, based on the first value and the second value.

In an example, the processor may identify first coordinates in the direction of a second axis among a first axis, the second axis, and a third axis, based on a third point corresponding to the center of a segment formed by a first point and a second point corresponding to the first value, and may identify a position of the second virtual box, based on the first coordinates in the direction of the second axis and second coordinates in the direction of the first axis of the first virtual box included in the track information representing the second external vehicle at the first time, the track information not meeting the reference reliability.

In an example, the processor may store each of the pieces of virtual track information in the memory, using a moving-window scheme, depending on a time when each of the pieces of virtual track information from the second time point to the first time point, the pieces of virtual track information being stored in the memory and including the virtual track information, is obtained.

In an example, the processor may perform time compensation for each of the pieces of virtual track information stored in the memory, based on at least one of a longitudinal speed of the vehicle, a lateral speed of the vehicle, a reference time (e.g., a time if a vehicle travels from a first position to a second position), a yaw rate of the vehicle, or coordinates of the virtual box corresponding to the second external vehicle at the first time point, or any combination thereof.

In an example, the processor may identify that the vehicle enters a curved section, based on at least one of a speed of the vehicle or a yaw rate of the vehicle, or any combination thereof, and may correct at least one of the first heading direction of the virtual box, the position of the virtual box, a size of the virtual box, or the track path tracking the second external vehicle, or any combination thereof, based on a portion of the virtual track path included in the virtual track information.

According to another example of the present disclosure, a vehicle control method may include identifying, by a processor, whether at least one of whether a second external vehicle at a first time, the second external vehicle traveling in front of a first external vehicle obtained by a sensor (e.g., light detection and ranging (LiDAR) sensor) is in a moving state, a type of the second external vehicle, or a first heading direction of a virtual box corresponding to the second external vehicle, or any combination thereof meets a specified condition, based on that track information representing the second external vehicle does not meet reference reliability, obtaining, by the processor, virtual track information by correcting at least one of a track path tracking the second external vehicle, the first heading direction of the virtual box, or a position of the virtual box, or any combination thereof, based on that the specified condition is met, and outputting, by the processor, the virtual track information as the track information representing the second external vehicle at the first time point, based on at least one of whether the second external vehicle is in the moving state, whether a difference between the first heading direction of the virtual box and a second heading direction of a vehicle is less than or equal to a specified angle, the type of the second external vehicle, the number of pieces of virtual track information from a second time point prior to the first time point to the first time point, the pieces of virtual track information being stored in a memory and including the virtual track information, a length of a virtual track path included in the virtual track information, a position of the virtual box included in the virtual track information, or whether the vehicle makes a lane change, or any combination thereof.

The vehicle control method according to an example may further include obtaining the virtual track information, based on that the second external vehicle is in the moving state and there is the track information representing the second external vehicle at the first time point, the track information not meeting the reference reliability, that the type of the second external vehicle is a passenger vehicle, a commercial vehicle, or an unknown type of vehicle, and that the virtual box is in a lateral movement state or the first heading direction of the virtual box is not the same direction as the vehicle.

The vehicle control method according to an example may further include deleting the pieces of virtual track information from the second time point to the first time point, the pieces of virtual track information being stored in the memory and including the virtual track information, without obtaining the virtual track information, based on that the second external vehicle is in the moving state and there is the track information representing the second external vehicle at the first time point, the track information not meeting the reference reliability, and that the type of the second external vehicle is not a passenger vehicle, a commercial vehicle, or an unknown type of vehicle, or that the virtual box is not in a lateral movement state and the first heading direction of the virtual box is the same direction as the vehicle.

The vehicle control method according to an example may further include correcting a position of the virtual box at the first time point, based on the track information representing the second external vehicle at the first time point and each of positions of the virtual box, the positions being included in each of datasets corresponding to the second external vehicle from the second time point to the first time point, the datasets being stored in the memory, obtaining the track information representing the second external vehicle at the first time point and a third heading direction in which the first heading direction of the virtual box is corrected, the first heading direction is included in each of the datasets corresponding to the second external vehicle from the second time point to the first time point, the datasets being stored in the memory, and obtaining the virtual track information, based on the corrected position of the virtual box at the first time point and the third heading direction.

The vehicle control method according to an example may further include storing the obtained virtual track information in the memory, based on that the second external vehicle is in the moving state, that the difference between the first heading direction of the virtual box and the second heading direction of the vehicle is less than or equal to the specified angle, that the type of the second external vehicle is classified as a vehicle, that the number of the pieces of virtual track information stored in the memory is greater than or equal to a reference number, that the length of the virtual track path included in the virtual track information is greater than a reference length, that the position of the virtual box is present in a specified area, and that the vehicle does not make the lane change.

The vehicle control method according to an example may further include identifying a first scatter plot of first tracking points included in the virtual track information and a second scatter plot of second tracking points included in the track information representing the second external vehicle at the first time, based on obtaining the virtual track information and storing the virtual track information in the memory, based on that the first scatter plot is less than a reference scatter plot and that the second scatter plot is greater than or equal to the reference scatter plot.

In an example, the virtual box may include a first virtual box. The vehicle control method may further include selecting a first value being relatively larger between a width of the first virtual box, the width being obtained by a plurality of points corresponding to the second external vehicle at the first t time point, and a reference width, selecting a second value being relatively larger between a length of the first virtual box, the length being obtained by the plurality of points corresponding to the second external vehicle at the first time point, and a reference length, and generating a second virtual box in which a size of the first virtual box is corrected, based on the first value and the second value.

The vehicle control method according to an example may further include identifying first coordinates in the direction of a second axis among a first axis, the second axis, and a third axis, based on a third point corresponding to the center of a segment formed by a first point and a second point corresponding to the first value, and identifying a position of the second virtual box, based on the first coordinates in the direction of the second axis and second coordinates in the direction of the first axis of the first virtual box included in the track information representing the second external vehicle at the first time, the track information not meeting the reference reliability.

The vehicle control method according to an example may further include storing each of the pieces of virtual track information in the memory, using a moving-window scheme, depending on a time when each of the pieces of virtual track information from the second time point to the first time point, the pieces of virtual track information being stored in the memory and including the virtual track information, is obtained, and performing time compensation for each of the pieces of virtual track information stored in the memory, based on at least one of a longitudinal speed of the vehicle, a lateral speed of the vehicle, a reference time, a yaw rate of the vehicle, or coordinates of the virtual box corresponding to the second external vehicle at the first time point, or any combination thereof.

Furthermore, the present technology may generate virtual track information by using track information representing the second external vehicle which travels in front of the first external vehicle and may output the generated virtual track information as the track information representing the second external vehicle.

Furthermore, the present technology may stably output a heading direction of a virtual box corresponding to the second external vehicle covered by the first external vehicle, a position of the virtual box corresponding to the second external vehicle, and a track path tracking the second external vehicle.

In addition, various effects ascertained directly or indirectly through the present disclosure may be provided.

Hereinabove, although the present disclosure has been described with reference to examples and the accompanying drawings, the present disclosure is not limited thereto, but may be variously modified and altered by those skilled in the art to which the present disclosure pertains without departing from the spirit and scope of the present disclosure claimed in the following claims.

Therefore, examples of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus comprising:
a light detection and ranging (LiDAR) sensor;
a memory; and
a processor,
wherein the processor is configured to:
based on track information representing a second external vehicle not satisfying reference reliability, wherein the second external vehicle travels in front of a first external vehicle detected by the LiDAR sensor, determine whether a specified condition is satisfied by at least one of:
the second external vehicle at a first time point being in a moving state,
a type of the second external vehicle,
a first heading direction of a virtual box corresponding to the second external vehicle, or
any combination thereof,
obtain, based on the specified condition being satisfied, virtual track information by correcting at least one of a track path tracking the second external vehicle, the first heading direction of the virtual box, or a position of the virtual box or any combination thereof, and
output the virtual track information as the track information representing the second external vehicle at the first time point, based on at least one of:
whether the second external vehicle is in the moving state,
whether a difference between the first heading direction of the virtual box and a second heading direction of a host vehicle is less than or equal to a specified angle,
the type of the second external vehicle,
a number of pieces of the virtual track information from a second time point prior to the first time point to the first time point,
the pieces of the virtual track information being stored in the memory and including the virtual track information,
a length of a virtual track path included in the virtual track information,
a position of the virtual box included in the virtual track information, or
whether the host vehicle makes a lane change, or any combination thereof.

2. The apparatus of claim 1, wherein the virtual track information is obtained by adjusting at least one of a track path tracking the second external vehicle, the first heading direction of the virtual box, and a position of the virtual box.

3. The apparatus of claim 1, wherein the processor is configured to:
obtain the virtual track information, based on:
the second external vehicle being in the moving state,
the track information representing the second external vehicle at the first time point,
the track information not meeting the reference reliability,
the type of the second external vehicle being a passenger vehicle, a commercial vehicle, or an unknown type of vehicle,
the virtual box being in a lateral movement state, or
the first heading direction of the virtual box not being a same direction as the host vehicle.

4. The apparatus of claim 1, wherein the processor is configured to:
delete the pieces of the virtual track information from the second time point to the first time point, the pieces of the virtual track information being stored in the memory and including the virtual track information, without obtaining the virtual track information, based on:
the second external vehicle being in the moving state,
the track information representing the second external vehicle at the first time point,
the track information not meeting the reference reliability,
the type of the second external vehicle not being a passenger vehicle, a commercial vehicle, or an unknown type of vehicle, or
the virtual box not being in a lateral movement state and the first heading direction of the virtual box being a same direction as the host vehicle.

5. The apparatus of claim 1, wherein the processor is configured to:
adjust a position of the virtual box at the first time point, wherein the adjustment of the position of the virtual box is based on the track information representing the second external vehicle at the first time point and each of positions of the virtual box, the positions being included in each of datasets corresponding to the second external vehicle from the second time point to the first time point, and the datasets being stored in the memory;
obtain the track information representing the second external vehicle at the first time point and a third heading direction, wherein the first heading direction of the virtual box is adjusted in the third heading direction, the first heading direction is included in each of the datasets corresponding to the second external vehicle from the second time point to the first time point, and the datasets are stored in the memory; and obtain the virtual track information, based on the third heading direction and the adjusted position of the virtual box at the first time point, the virtual track information.

6. The apparatus of claim 1, wherein the processor is configured to store the virtual track information in the memory, based on:

the second external vehicle being in the moving state, the difference between the first heading direction of the virtual box and the second heading direction of the host vehicle being less than or equal to the specified angle, the type of the second external vehicle, the number of the pieces of the virtual track information being greater than or equal to a reference number, the length of the virtual track path being greater than a reference length, the position of the virtual box being present in a specified area, and the host vehicle not making the lane change.

7. The apparatus of claim 1, wherein the processor is configured to:

determine a first value associated with a first scatter plot of first tracking points included in the virtual track information and a second value associated with a second scatter plot of second tracking points included in the track information representing the second external vehicle at the first time point, based on obtaining the virtual track information; and store the virtual track information in the memory, based on the first value being less than a reference scatter value and the second value being greater than or equal to the reference value.

8. The apparatus of claim 1, wherein the virtual box includes a first virtual box, and wherein the processor is configured to:

select, as a first value, a larger one of a width value of the first virtual box and a reference width value, wherein the width value is obtained based on a plurality of points corresponding to the second external vehicle at the first time point;

select, as a second value, a larger one of a length value of the first virtual box and a reference length value, wherein the length value is obtained based on the plurality of points corresponding to the second external vehicle at the first time point; and generate, based on the first value and the second value, a second virtual box, wherein a size of the first virtual box is adjusted in the second virtual box.

9. The apparatus of claim 8, wherein the processor is configured to:

determine, first coordinates in the direction of a second axis among a first axis, the second axis, and a third axis, based on a third point corresponding to a center of a segment formed by a first point and a second point associated with the first value; and determine a position of the second virtual box, based on the first coordinates in the direction of the second axis and second coordinates in a direction of the first axis of the first virtual box included in the track information representing the second external vehicle at the first time, wherein the track information does not meet the reference reliability.

10. The apparatus of claim 1, wherein the processor is configured to:

store each of the pieces of the virtual track information in the memory, using a moving-window scheme, depending on a time when each of the pieces of the virtual track information from the second time point to the first time point, the pieces of virtual track information being stored in the memory and including the virtual track information, is obtained.

11. The apparatus of claim 10, wherein the processor is configured to:

perform time compensation for each of the pieces of the virtual track information stored in the memory, based on at least one of:

a longitudinal speed of the host vehicle, a lateral speed of the host vehicle, a reference time associated with the host vehicle, a yaw rate of the host vehicle, or coordinates of the virtual box corresponding to the second external vehicle at the first time point.

12. The apparatus of claim 1, wherein the processor is configured to:

determine, based on at least one of a speed of the host vehicle or a yaw rate of the host vehicle, that the host vehicle enters a curved section; and adjust, based on a portion of the virtual track path included in the virtual track information, at least one of:

the first heading direction of the virtual box, the position of the virtual box, a size of the virtual box, or the track path tracking the second external vehicle.

13. A method performed by a processor, the method comprising:

based on track information representing a second external vehicle not satisfying reference reliability, wherein the second external vehicle travels in front of a first external vehicle detected by a light detection and ranging (LiDAR) of a vehicle, determining, by a processor, whether a specified condition is satisfied by at least one of:

the second external vehicle at a first time point being in a moving state, a type of the second external vehicle, a first heading direction of a virtual box corresponding to the second external vehicle, or any combination thereof;

obtaining, by the processor and based on the specified condition being satisfied, virtual track information by correcting at least one of a track path tracking the second external vehicle, the first heading direction of the virtual box, or a position of the virtual box, or any combination thereof; and outputting, by the processor, the virtual track information as the track information representing the second external vehicle at the first time point, based on at least one of:

whether the second external vehicle is in the moving state, whether a difference between the first heading direction of the virtual box and a second heading direction of the vehicle is less than or equal to a specified angle, the type of the second external vehicle, a number of pieces of the virtual track information from a second time point prior to the first time point to the first time point, the pieces of the virtual track information being stored in a memory and including the virtual track information,
a length of a virtual track path included in the virtual track information,
a position of the virtual box included in the virtual track information, or
whether the vehicle makes a lane change, or any combination thereof.

14. The method of claim 13, wherein the obtaining of the virtual track information comprises obtaining the virtual track information, based on at least one of:
the second external vehicle being in the moving state,
the track information representing the second external vehicle at the first time point,
the track information not meeting the reference reliability,
the type of the second external vehicle being a passenger vehicle, a commercial vehicle, or an unknown type of vehicle,
the virtual box being in a lateral movement state, or
the first heading direction of the virtual box not being a same direction as the vehicle, and
wherein the method further comprising:
controlling, based on a signal indicating the virtual track information, autonomous operation of the vehicle.

15. The method of claim 13, further comprising:
deleting the pieces of the virtual track information stored in the memory, based on:
the second external vehicle being in the moving state,
the track information representing the second external vehicle at the first time point,
the track information not meeting the reference reliability,
the type of the second external vehicle not being a passenger vehicle, a commercial vehicle, or an unknown type of vehicle, or
the virtual box not being in a lateral movement state and the first heading direction of the virtual box being a same direction as the vehicle.

16. The method of claim 13, further comprising:
adjusting a position of the virtual box at the first time point, wherein the adjusting the position of the virtual box is based on the track information representing the second external vehicle at the first time point and each of positions of the virtual box, the positions being included in each of datasets corresponding to the second external vehicle from the second time point to the first time point, the datasets being stored in the memory;
obtaining the track information representing the second external vehicle at the first time point and a third heading direction wherein the first heading direction of the virtual box is adjusted in the third heading direction, the first heading direction is included in each of the datasets corresponding to the second external vehicle from the second time point to the first time point, and the datasets is stored in the memory; and
obtaining, based on the third heading direction and the adjusting the position of the virtual box at the first time point, the virtual track information.

17. The method of claim 13, further comprising:
storing the virtual track information in the memory, based on at least one of:
the second external vehicle being in the moving state,
a difference between the first heading direction of the virtual box and the second heading direction of the vehicle being less than or equal to a specified angle,
the type of the second external vehicle,
the number of the pieces of the virtual track information being greater than or equal to a reference number,
the length of the virtual track path being greater than a reference length,
the position of the virtual box being present in a specified area, or
the vehicle not making the lane change.

18. The method of claim 13, further comprising:
determining a first value associated with a first scatter plot of first tracking points included in the virtual track information and a second value associated with a second scatter plot of second tracking points included in the track information representing the second external vehicle at the first time point; and
storing, based on the first value being less than a reference scatter value and the second value being greater than or equal to the reference value, the virtual track information in the memory.

19. The method of claim 13, wherein the virtual box includes a first virtual box, and further comprising:
selecting, as a first value, a larger one of a width value of the first virtual box and a reference width value, wherein the width value is obtained based on a plurality of points corresponding to the second external vehicle at the first time point;
selecting, as a second value, a larger one of a length value of the first virtual box and a reference length value, wherein the length value is obtained based on the plurality of points corresponding to the second external vehicle at the first time point; and
generating, based on the first value and the second value, a second virtual box, wherein a size of the first virtual box is adjusted in the second virtual box.

20. The method of claim 19, further comprising:
determining, based on a third point corresponding to a center of a segment formed by a first point and a second point associated with the first value, first coordinates in a direction of a second axis among a first axis, the second axis, and a third axis of the first virtual box included in the track information, wherein the first virtual box represents the second external vehicle at the first time point, and wherein the first axis is parallel to a driving direction of the vehicle, and the second axis and the third axis being perpendicular to the first axis; and
determining, based on the first coordinates in the direction of the second axis and second coordinates in a direction of the first axis, that the track information does not meet the reference reliability.

21. The method of claim 13, further comprising:
storing, based on a moving-window scheme, each of the pieces of the virtual track information in the memory, wherein each of the pieces of the virtual track information is obtained at a time from the second time point to the first time point; and
performing time compensation for each of the pieces of the virtual track information stored in the memory, based on at least one of:
a longitudinal speed of the vehicle,
a lateral speed of the vehicle,
a reference time associated with the vehicle,
a yaw rate of the vehicle, or coordinates of the virtual box corresponding to the second external vehicle at the first time point.

* * * * *